US010574410B2

(12) United States Patent
He et al.

(10) Patent No.: US 10,574,410 B2
(45) Date of Patent: Feb. 25, 2020

(54) TRANSMISSION AND RECEPTION IN A DETERMINED THIRD SET OF TIME-FREQUENCY RESOURCES

(71) Applicant: Telefonaktiebolaget LM Ericsson (publ), Stockholm (SE)

(72) Inventors: Ning He, Sollentuna (SE); Johan Axnäs, Solna (SE); Robert Baldemair, Solna (SE); Dennis Hui, Sunnyvale, CA (US); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 288 days.

(21) Appl. No.: 15/526,437

(22) PCT Filed: May 29, 2015

(86) PCT No.: PCT/SE2015/050626
§ 371 (c)(1),
(2) Date: May 12, 2017

(87) PCT Pub. No.: WO2016/085379
PCT Pub. Date: Jun. 2, 2016

(65) Prior Publication Data
US 2018/0302197 A1 Oct. 18, 2018

Related U.S. Application Data

(60) Provisional application No. 62/083,337, filed on Nov. 24, 2014, provisional application No. 62/083,339, (Continued)

(51) Int. Cl.
H04L 5/00 (2006.01)
H04L 5/14 (2006.01)
(Continued)

(52) U.S. Cl.
CPC .............. *H04L 5/0005* (2013.01); *H04L 5/14* (2013.01); *H04W 72/046* (2013.01);
(Continued)

(58) Field of Classification Search
None
See application file for complete search history.

(56) References Cited

U.S. PATENT DOCUMENTS

| 2007/0086368 A1 | 4/2007 | Lee et al. |
| 2008/0170633 A1 | 7/2008 | Karino |

(Continued)

FOREIGN PATENT DOCUMENTS

| EP | 2672774 A1 | 12/2013 |
| GB | 2424805 A | 10/2006 |

(Continued)

OTHER PUBLICATIONS

Unknown, Author, "Uplink Reference Signals in Support of High-Speed UEs", 3GPP TSG RAN WG1 #51, R1-074678, Texas Instruments, Jeju, Korea, Nov. 5-9, 2007, pp. 1-6.

(Continued)

*Primary Examiner* — Jamaal Henson
(74) *Attorney, Agent, or Firm* — Patent Portfolio Builders, PLLC

(57) ABSTRACT

A method performed by a first communication node (511) in communication with a second communication node (512). The second node (512) is a receiver or transmitter of data in a frame (800). The frame (800) comprises one first set of time-frequency resources (801) reserved for control information, and a second set of time-frequency resources (802) reserved for data. The first node (511) determines that a third set (803) is to be used for communication of information with a third communication node (513). The information is control information, data information, or one or more signals related to one or more measurement procedures. The first node (511) determines a direction of communication in the third set (803), based on the information to be communicated. The first node (511) performs transmission or recep-
(Continued)

tion to or from the third node (513) in the determined direction, and in the third set (803).

15 Claims, 15 Drawing Sheets

Related U.S. Application Data filed on Nov. 24, 2014, provisional application No. 62/083,353, filed on Nov. 24, 2014.

(51) Int. Cl.
*H04W 72/04* (2009.01)
*H04W 72/08* (2009.01)
*H04W 92/20* (2009.01)
*H04B 7/26* (2006.01)
*H04B 7/0413* (2017.01)
*H04L 5/16* (2006.01)

(52) U.S. Cl.
CPC ... *H04W 72/0446* (2013.01); *H04W 72/0453* (2013.01); *H04B 7/0413* (2013.01); *H04B 7/2615* (2013.01); *H04L 5/16* (2013.01); *H04W 72/044* (2013.01); *H04W 72/082* (2013.01); *H04W 92/20* (2013.01)

(56) References Cited

U.S. PATENT DOCUMENTS

| | | |
|---|---|---|
| 2010/0027512 A1 | 2/2010 | Kishiyama et al. |
| 2010/0080139 A1* | 4/2010 | Palanki ............... H04B 7/2606 370/252 |
| 2010/0080166 A1* | 4/2010 | Palanki ............... H04B 7/2606 370/315 |
| 2010/0097978 A1* | 4/2010 | Palanki ............... H04B 7/2606 370/315 |
| 2010/0232285 A1* | 9/2010 | Lee ..................... H04B 7/15507 370/210 |
| 2010/0309775 A1 | 12/2010 | Muharemovic et al. |
| 2011/0310835 A1 | 12/2011 | Cho et al. |
| 2012/0087393 A1 | 4/2012 | Jeong et al. |
| 2012/0176956 A1* | 7/2012 | Ji ........................ H04L 5/0091 370/315 |
| 2012/0287874 A1 | 11/2012 | Oketani |
| 2013/0279614 A1 | 10/2013 | Walton et al. |
| 2014/0003544 A1 | 1/2014 | Oketani et al. |
| 2014/0106740 A1 | 4/2014 | Zhou et al. |
| 2014/0153420 A1 | 6/2014 | Garin et al. |

FOREIGN PATENT DOCUMENTS

| | | |
|---|---|---|
| WO | 2008007375 A2 | 1/2008 |
| WO | 2009014764 A1 | 1/2009 |
| WO | 2014/056517 A1 | 4/2014 |
| WO | 2014121833 A1 | 8/2014 |

OTHER PUBLICATIONS

Extended European Search Report issued in corresponding application No. 15863678.7; dated Jun. 4, 2018, 7 pages. The reference not cited therein has been previously made of record.

* cited by examiner

TRANSMISSION AND RECEPTION IN A DETERMINED THIRD SET OF TIME-FREQUENCY RESOURCES

TECHNICAL FIELD

Embodiments herein relate to a first communication device configured to be in communication with a second communication node, and methods performed by the first communication device for performing one of transmission and reception to or from, respectively, a third communication node. Embodiments herein further relate to computer programs and computer-readable storage mediums, having stored thereon the computer programs to carry out these methods.

BACKGROUND

Communication devices such as wireless devices are also known as e.g. User Equipments (UE), mobile terminals, wireless terminals and/or mobile stations. Wireless devices are enabled to communicate wirelessly in a communications network or wireless communication system, sometimes also referred to as a radio system or networks. The communication may be performed e.g. between two wireless devices, between a wireless device and a regular telephone and/or between a wireless device and a server via a Radio Access Network (RAN) and possibly one or more core networks, comprised within the communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The communications network may covers a geographical area which may be divided into cell areas, wherein each cell area being served by an Access Node (AN) such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Communications such as transmissions in radio communication systems are often organized in terms of frames, or sometimes subframes, e.g. in LTE, where each frame is a group of communication resources, e.g., radio time and frequency resources, that may comprise both, a control field and a payload data field, or multiple fields of the respective types. A field is understood herein to refer to a set of time and frequency resources, also referred to herein as time-frequency resources. Examples of time-frequency resources are symbols, resource elements, OFDM symbols, Filter-Bank Multi-Carrier (FBMC) symbols, symbols of some of the type of multi-carrier modulation scheme, a set of any of the mentioned types of symbols, etc. . . . . The time-frequency resources corresponding to a field may be contiguous in the time and frequency dimensions. The control field may, e.g., comprise information about how the data part of the frame is encoded and modulated. The control field may also be used for receiving feedback information in the reverse link direction, i.e., from the receiver of the data, e.g., for receiving ACKnowledgement/Negative ACKnowledgement (ACK/NACK) or channel state information reports.

Half-Duplex

In many radio communication systems, communication nodes are only capable of half-duplex communication, i.e., a network node, e.g., an AN or a UE, may not both transmit and receive at the same time, at least not on the same frequency band. The main reason for such a limitation is that a network node that is transmitting may saturate its own analog receiving circuitry due to overhearing between transmit and receive antennas.

An implication of this is that data may only be communicated, e.g., transmitted, in one link direction at a time. However, even for one-directional data communication, there is, as explained above, normally a need for regular communications of control information in both link directions, implying that in half-duplex communications, it may be useful to have two fields for control information in every frame, one for one link direction, and one for the reverse direction. Two fields may be useful also in full-duplex systems, but for other reasons. The two directions of a link will henceforth be referred to as Transmit/Receive (tx/rx) directions, or sometimes the two duplex directions. In other words, any given communication node may use one of the fields for transmission (tx) and the other field for reception (rx). The link direction may also be referred to herein as a direction of communication.

Communication as used herein, refers to one of transmission or reception, which may be also referred to collectively as "transmission", such as a transmission of data or a transmission of control information. Control information refers herein to, e.g., channel state information, reception acknowledgement reports such as ACK/NACK reports, other types of feedback, Medium Access Control (MAC) messages, information about coding and modulation schemes used in associated data transmissions, other types of system link configuration messages, etc. . . . . Data information refers herein to, e.g., payload data, which may in turn contain data information as well as control information for higher layers in the protocol stack.

Frame Structure

A possible frame structure and link-direction assignments is illustrated as a schematic diagram in FIG. 1, cf. also "Time-division duplexing", WO 2014/121833 A1 (PCT/EP2013/052376). Any two communication nodes communicating may in principle arbitrarily select which of the two control fields may be used for tx and which for rx, see left and right panels of FIG. 1. However, such arbitrariness may require complicated negotiation procedures and hence it is often more practical to have a general rule for the system, e.g., that one of the fields is always used for DL communication, i.e., tx by ANs, whereas the other field is always used for UL communication recepion, i.e., tx by UEs, see the illustration in FIG. 2 for a schematic diagram of another possible frame structure and respective link-direction assignments. Note also that frames on different links in the system may preferably be time-aligned, partly because this enables communication nodes to more freely and efficiently change communication partner, that is node, from one frame to another, without waiting for the other communication link to finish its frame.

Fields are in most transmission systems further divided into smaller units, e.g., in Orthogonal Frequency-Division Multiplexing (OFDM) systems, the fields may be further divided into one or more OFDM symbols. Similar holds for many other types of systems than OFDM, e.g., for many systems based on multi-carrier or pre-coded multi-carrier such as FBMC, Discrete Fourier Transform (DFT)-spread OFDM, etc. As a general term, such smaller units are referred to herein as symbols. Some fields may consist of only a single symbol.

Other Signals and Fields in and Between Frames

Switching of tx/rx direction may take some time, and therefore, may require an extra guard period between adjacent symbols that belong to fields with different duplex direction. Moreover, it should be noted that within the three fields, there may typically also be other signals interspersed, e.g., reference signals, or pilot signals, to allow the receiver to perform channel estimation. For simplicity, guard periods or other signals are not shown in these figures.

Self-Backhauling

In the case of radio communication systems with very dense deployment of ANs, as envisioned in particular for systems operating at millimeter-Wave (mmW) frequencies, it may be difficult and costly to provide a wired backhaul connection, that is, a connection with the core network or Internet, to all ANs in the system. One option is to use wireless backhaul, i.e., have one AN with wired connection, henceforth referred to herein as Aggregation Node, or AgN, that forwards data to the other ANs wirelessly over a route, see illustration of a network using wireless self-backhauling in FIG. 3. In the more general case, the routes may form a more complicated pattern, e.g. a route tree. A particularly attractive solution is to use wireless self-backhauling, i.e., use the same frequency spectrum for access links and backhaul links, which avoids the need for multiple radio units in each communication node. Note that in such a network, not only user data may have to be forwarded over the backhaul links, but also control signaling for, e.g., radio resource coordination between ANs, e.g., allocation of time-frequency radio resources and scheduling on access links, or for setting up routes, may have to be performed wirelessly.

Communication networks such as those with very dense deployments of communication nodes, may require exchange of control information among a number of communication nodes, or even all of them, within a certain time period, e.g., a frame. However, current frame structures do not provide for such communication.

Also, communication networks such as those with very dense deployments of communication nodes or such as those with a combination of self-backhauling and half duplex, may require performance of measurement procedures among a number of communication nodes, or even all of them, within a certain time period, e.g., a frame. With current frame structures, a communication node is allowed to perform particular types of measurements. Hence, control of interference or other types of signals in a communications network, leads to underperformance of communications in the network.

SUMMARY

It is an object of embodiments herein to improve the performance of a communications network by providing improved methods of performing any one of transmission and reception of information, such as control information, data information and one or more signals related to one or more measurement procedures.

According to a first aspect of embodiments herein, the object is achieved by a method performed by a first communication node in communication with a second communication node. The method is for performing one of transmission and reception to or from, respectively, a third communication node. The second communication node is a receiver or transmitter of data from or to the first communication node in a frame. The frame comprises at least one first set of time-frequency resources, and a second set of time-frequency resources. The at least one first set of time-frequency resources is reserved for communication of control information. The second set of time-frequency resources is reserved for communication of at least data information. The first communication node, the second communication node, and the third communication node operate in a communications network. The first communication node also determines that a third set of time-frequency resources is to be used for communication of information with the third communication node. The information is one of: control information, data information, and one or more signals related to one or more measurement procedures. The first communication node determines a direction of communication in the third set of time-frequency resources. The direction of communication is one of transmission and reception. The direction of communication in the third set of time-frequency resources is based on the information to be communicated. The first communication node performs one of transmission or reception to or from, respectively, the third communication node in the determined direction of communication. The performing of the one of transmission or reception is in the third set of time-frequency resources determined to be used for communication of information with the third communication node.

According to a second aspect of embodiments herein, the object is achieved by the first communication node configured to be in communication with the second communication node. The first communication node is further configured to perform one of transmission and reception to or from, respectively, the third communication node. The second communication node is configured to be the receiver or transmitter of data from or to the first communication node in the frame. The frame comprises at least the one first set of time-frequency resources, and the second set of time-frequency resources. The at least one first set of time-frequency resources is reserved for communication of control information, and the second set of time-frequency resources is reserved for communication of at least data information. The first communication node, the second communication node and the third communication node are configured to operate in the communications network. The first communication node is further configured to determine that the third set of time-frequency resources is to be used for communication of information with the third communication node. The information is one of: control information, data information, and one or more signals related to one or more measurement procedures. The first communication node is further configured to determine the direction of communication in the third set of time-frequency resources. The direction of communication is one of transmission and reception. The direction of communication in the third set of time-frequency resources is configured to be based on the information to be communicated. The first communication node is also configured to perform one of transmission or reception to or from, respectively, the third communication node in the determined direction of communication. To perform the of the one of transmission or reception is configured to be in the third set of time-frequency resources determined to be used for communication of information with the third communication node.

According to a third aspect of embodiments herein, the object is achieved by a computer program, comprising instructions which, when executed on at least one processor, cause the at least one processor to carry out the method performed by the first communication node.

According to a fourth aspect of embodiments herein, the object is achieved by a computer-readable storage medium, having stored thereon a computer program, comprising instructions which, when executed on at least one processor, cause the at least one processor to carry out the method performed by the first communication node.

By the first communication node 511 determining that a third set of time-frequency resources in the frame is to be used for communication of information, e.g., control information, the first communication node 511 with e.g., half-duplex restrictions, may efficiently exchange information, e.g., control signalling, with two or more communication nodes in the same frame, in both duplex directions. This may be performed in a configuration where the other sets of time-frequency resources in the frame have a fixed direction of communication, which allows for flexibility of the signalling in the communications network, while minimizing the signalling among the communication nodes involved in a communication.

By the first communication node determining that a third set of time-frequency resources in the frame is to be used for communication of information, e.g., one or more signals related to one or more measurement procedures, the first communication node may also efficiently make measurements on transmission in other network links than the one currently being used for communication.

BRIEF DESCRIPTION OF THE DRAWINGS

Examples of embodiments herein are described in more detail with reference to the accompanying drawings, in which.

DETAILED DESCRIPTION

As part of the development of embodiments herein, a problem will first be identified and discussed. In this discussion of the problem of existing methods, ANs are used as examples of communications nodes, but the discussion should not be understood to be limited to them.

Figure 2:
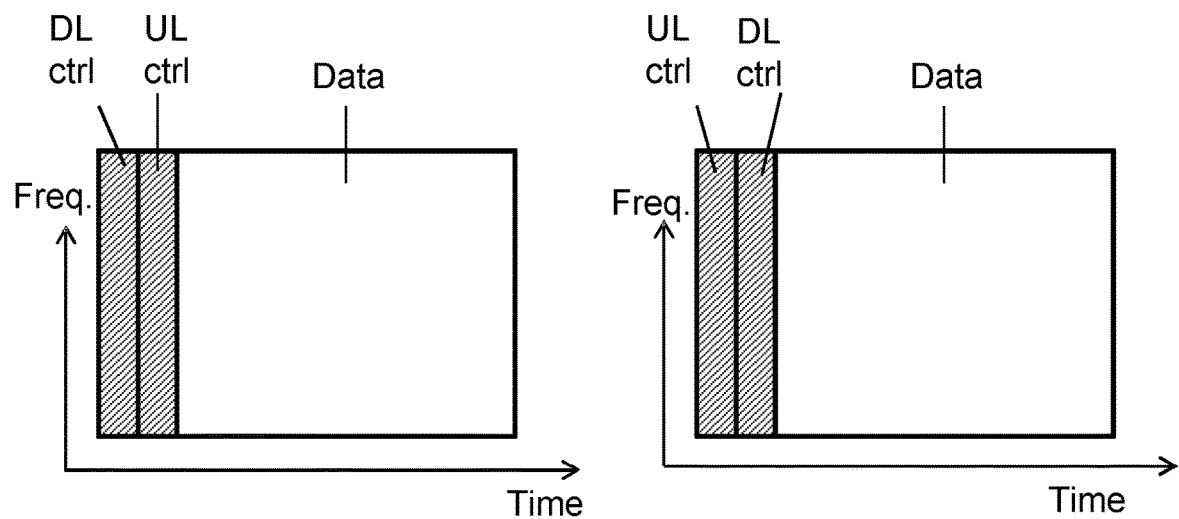
FIG. 2 is a schematic diagram of another possible frame structure and respective link-direction assignments, according to existing methods.
Figure 3:
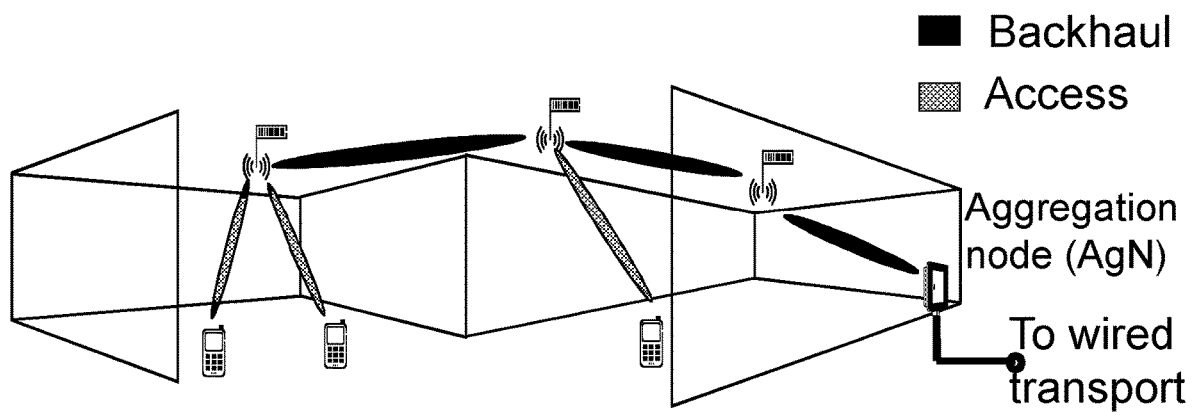
FIG. 3 is a schematic diagram illustrating of a network using wireless self-backhauling, according to existing methods.

If all communication in a communications network is organized according to the left panel of FIG. 2, then two ANs, without wired connection may not exchange any information, e.g., control signaling, data and one or more signals related to one or more measurement procedures with each other. The reason is that there are no fields, e.g., control fields, in which one AN transmits and the other one receives, i.e., either both transmit or both receive, at least under the assumption of time-aligned frames between links, as discussed above. The same, of course, holds if all communication is organized according to the right panel of FIG. 2.

Figure 1:
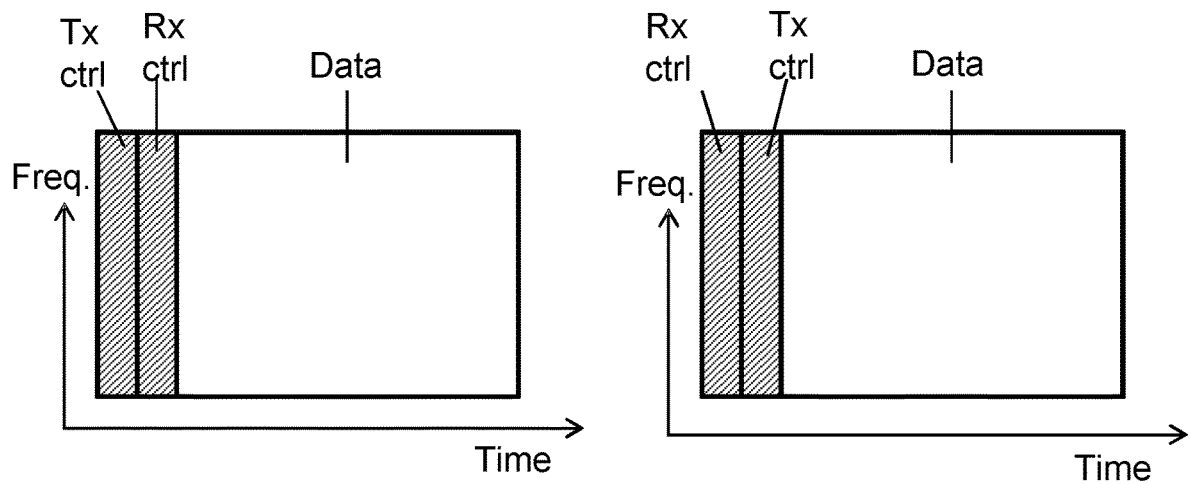
FIG. 1 is a schematic diagram illustrating an example of possible frame structure and link-direction assignments, according to existing methods.
Figure 4:
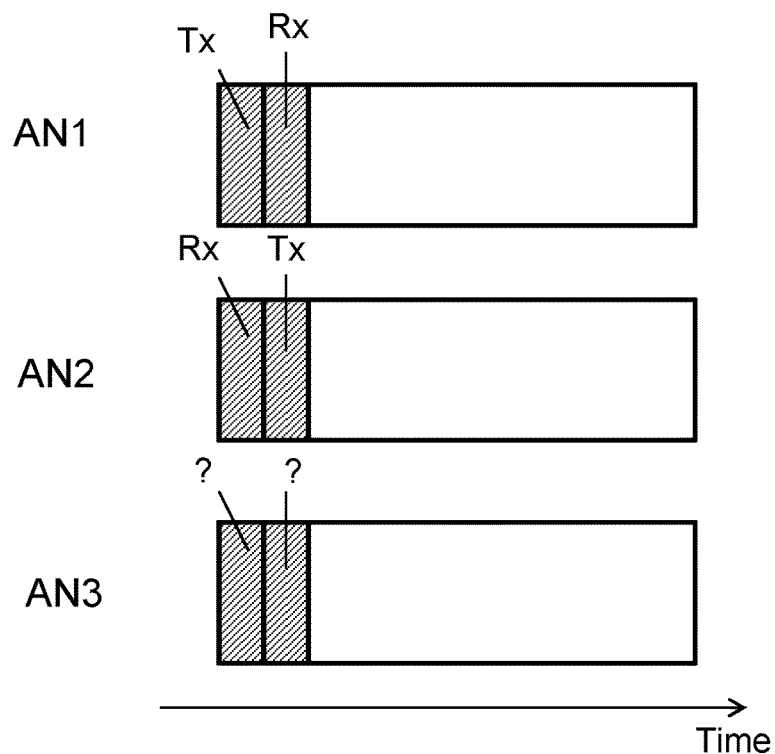
FIG. 4 is a schematic diagram illustrating a problematic control signaling situation in a network with fixed tx and rx assignment for control fields, according to existing methods.

Taking the exchange of control information as an example, while for any given pair of ANs it might seem possible to have different assignments for rx and tx for the control fields for the respective ANs, i.e., left panel of FIG. 1 for one communication node and right panel for the other communication node, such approach does not work in general, as there may be other nodes in the system that expect certain assignments, that is, communications to or from other communication nodes, e.g., UEs. Also, if three ANs all wish to communicate with each other, there is no fixed assignment that works for all three links, as illustrated in FIG. 4. FIG. 4 is a schematic diagram illustrating a problematic control signaling situation in a network with fixed tx and rx assignment for control fields, since there is no choice of tx and rx that allows AN3 to communicate with both AN1 and AN2.

In a particular case of one or more signals related to one or more measurement procedures, communication nodes in a communications network that communicate data between each other may typically want to measure interference from other communication links in the communication network, that is, links between two other communication nodes, e.g., in order to choose a modulation and coding scheme with the optimal trade-off between robustness and data rate. A communication node may also wish to measure the link quality it would have if receiving data from some other specific communication node. The one or more measurement procedures may be for example, measure interference or other signal from some other communication node(s) in the communication network 500, or transmit measurement signals to other communication nodes. Thus, examples of one or more measurement procedures may be, e.g., Reference Signal Received Power (RSRP), Reference Signal Received Quality (RSPQ). In agreement with this, examples of one or more signals related to one or more measurement procedures may be, for example, pilot sequences or reference signals, or any other type of signal, e.g., data and/or control information, that a node happens to be transmitting when another node is measuring the interference level from it. However, for simplicity reasons, the following description focuses on interference measurements.

Figure 5:
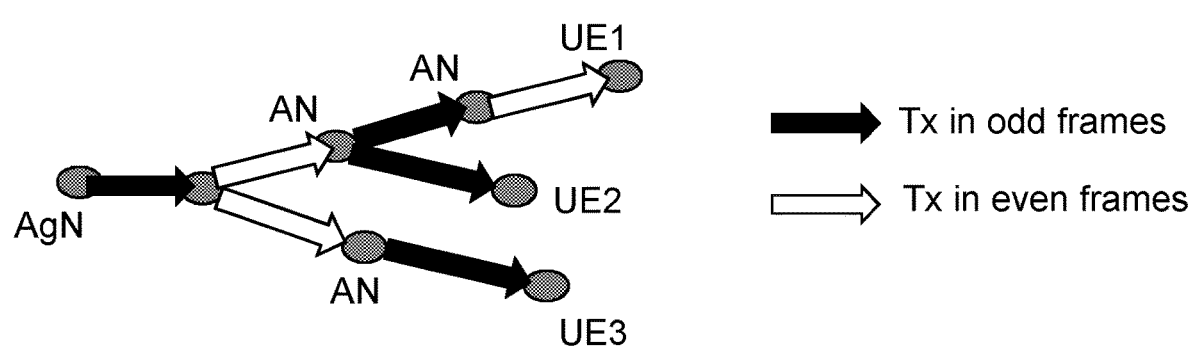
FIG. 5 is a schematic diagram illustrating the impact of half-duplex on communication in a self-backhauling route tree, according to existing methods.

With the existing frame structures such as that described above, a communication node may only be able to measure data interference from communication nodes that are transmitting data while the measuring communication node is receiving. However, in a communication network with self-backhauling, two communication nodes may for prolonged periods be constantly transmitting data at the same time and receiving data at the same time. This is a consequence of the half-duplex restriction. Consider a routing tree as shown in FIG. 5. FIG. 5 is a schematic diagram illustrating the impact of half-duplex on communication in a self-backhauling route tree. Two adjacent communication nodes along a route may not both transmit at the same time. Hence, in order to achieve as continuous flow of data as possible through a route, it may be possible to let every second communication node transmit data in one frame, and let the other communication nodes transmit the next frame, and so forth, alternatingly between frames. This may lead to an even-odd pattern along the routes, and in the case of a route tree, an even-odd pattern for the entire route tree. In other words, it may divide all the communication nodes into two parity groups, where all communication nodes in a parity group transmit at the same time and receive at the same time. Hence, it may be impossible for communication nodes in the same parity group to make measurements of each other's transmissions or receptions.

Terminologies

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node (e.g. MSC, MME etc), O&M, OSS, SON, positioning node (e.g. E-SMLC), MDT etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

The embodiments herein also applies to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive.

Components from one embodiment may be tacitly assumed to be present/used in another embodiment.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure. Thus, also note that terminology such as eNodeB and UE should be considering non-limiting.

Figure 6A:
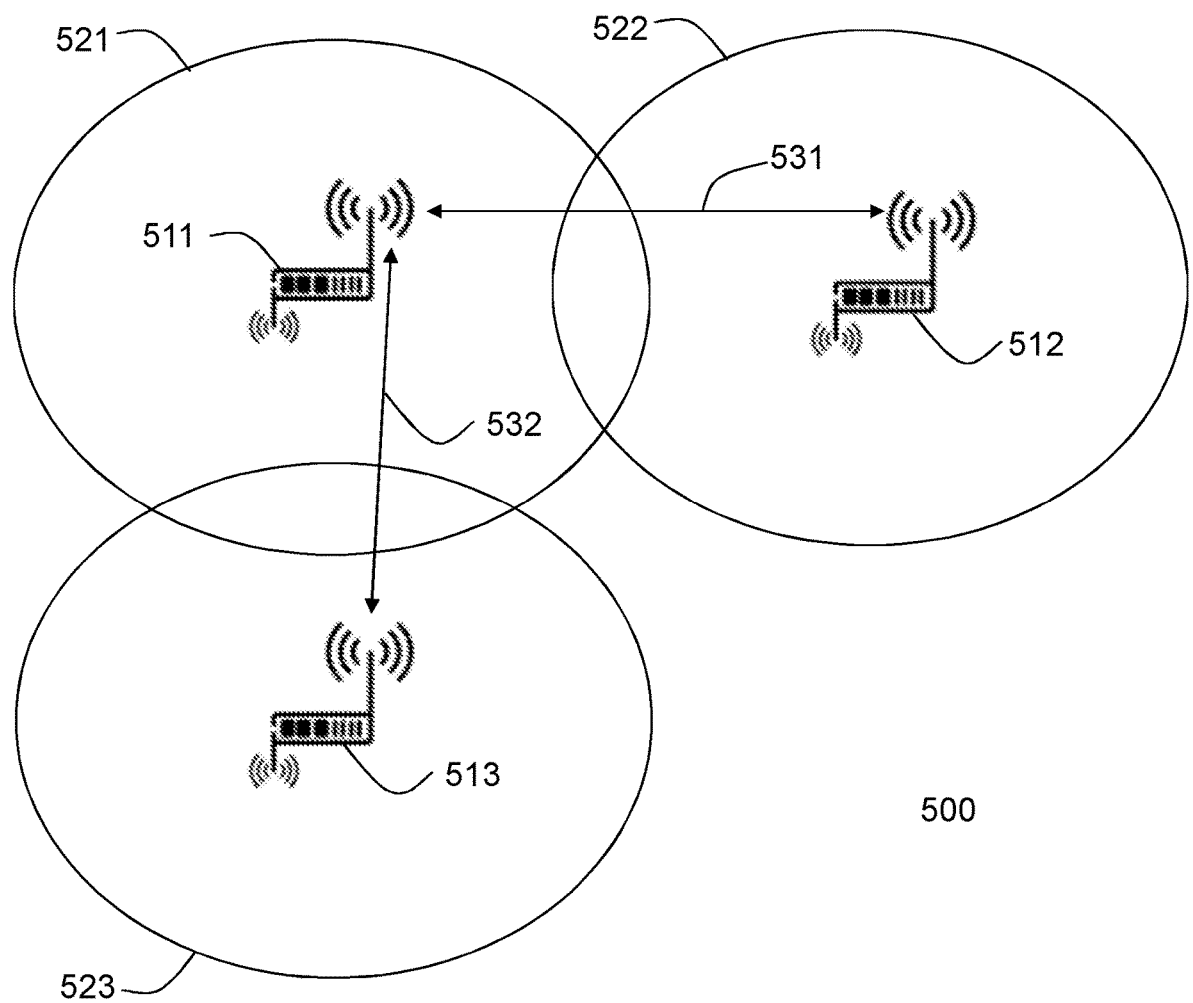
FIG. 6a is a schematic diagram illustrating an example of a communications network, according to some embodiments.
Figure 6B:
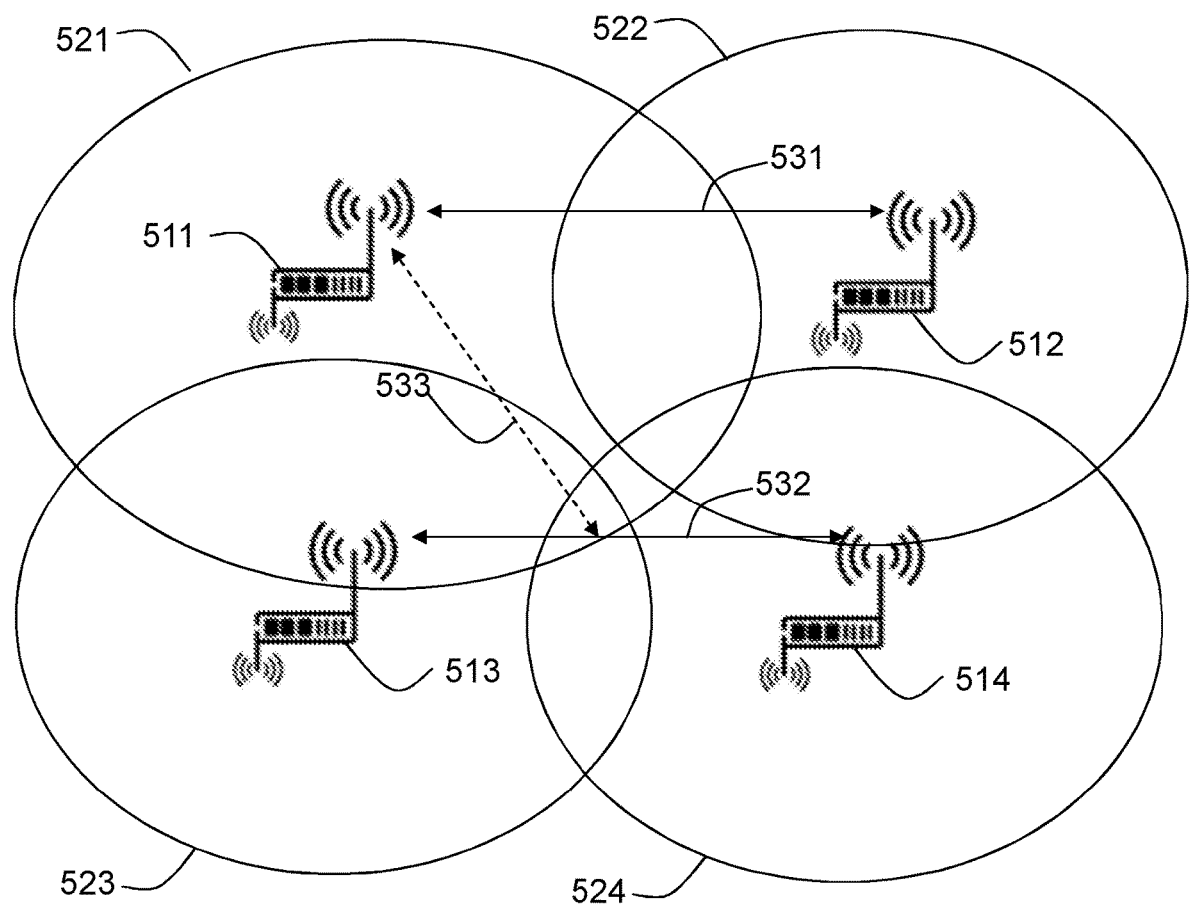
FIG. 6b is a schematic diagram illustrating an example of a communications network, according to some embodiments.

FIG. 6a and FIG. 6b each depict an example of a communications network 500 in which embodiments herein may be implemented. The communications network 500 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (VVCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) network, WiFi network, Worldwide Interoperability for Microwave Access (WiMax), 5G system or any cellular network or system.

The communications network 500 comprises a plurality of network nodes whereof three, a first communication node 511, a second communication node 512, a third communication node 513 are depicted in the example of FIG. 6a, and the same first communication node 511, second communication node 512, third communication node 513 are depicted in the example of FIG. 6b, in addition to a fourth communication node 514. The first communication node 511, the second communication node 512, the third communication node 513 and the fourth communication node 514, may each be a base station such as e.g. an eNB, eNodeB, BS, or any other network unit capable to serve a wireless device or a machine type communication device in the communications network 500. For example, such a network unit may be e.g., an AN, e.g., a short-range radio gateway, as depicted in the non-limiting example of FIG. 6b. In some particular embodiments, any of the first communication node 511, the second communication node 512, the third communication node 513, and the fourth communication node 514 may be a stationary relay node or a mobile relay node. The communications network 500 covers a geographical area which may be divided into cell areas, which may be overlapped, wherein each cell area is served by a radio communication node, although, one radio communication node may serve one or several cells. In the example depicted in FIG. 6b, the first communication node 511 serves a first cell 521, the second communication node 512 serves a second cell 522, the third communication node 513 serves a third cell 523, and the fourth communication node 514 serves a fourth cell 524. Any of the first communication node 511, the second communication node 512, the third communication node 513, and the fourth communication node 514 may be e.g. macro eNodeB, home eNodeB or a Home Node B, pico BS or femto BS, based on transmission power and thereby also cell size. Typically, the communications network 500 may comprise more cells similar to the first cell 521, the second cell 522, the third cell 523 and the fourth cell 524, served by their respective radio communication nodes. This is not depicted in FIG. 6b for the sake of simplicity.

In other examples than those depicted in FIG. 6a and FIG. 6b, wherein the communications network 500 is a cellular system, any of the first communication node 511, the second communication node 512, the third communication node 513 and the fourth communication node 514 may serve cells. In other examples than those depicted in FIG. 6a and FIG. 6b, wherein the communications network 500 is a non-cellular system, any of the first communication node 511, the second communication node 512, the third communication node 513 and the fourth communication node 514 may serve receiving nodes with serving beams.

Each of the first communication node 511, the second communication node 512, the third communication node 513, and the fourth communication node 514 may support one or several cellular communication technologies, e.g., IEEE 802.11ah, BLE etc. . . . and its name may depend on the technology and terminology used. The first communication node 511 may communicate with the second communication node 512 through a first link 531. The third communication node 513 may communicate with the fourth communication node 514 through a second link 532. The first communication node 511 may perform the one or more measurements through a third link 533. Each of the first link 531, the second link 532 and the third link 533 may be a wireless link, such as a radio link an optical link, or a wired link. In some embodiments, any of the first communication node 511, the second communication node 512, the third communication node 513 and the fourth communication node 514 may operate with wireless self-backhauling.

Any of the first communication node 511, the second communication node 512, the third communication node 513, and the fourth communication node 514 may also be a communications device, also known as e.g., UE, mobile terminal, wireless terminal, mobile station, mobile telephone, cellular telephone, or laptop with wireless capability, just to mention some further examples. The communications device in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device, modems, or any other radio network unit capable of communicating over a wireless or wired link in the communications network 500. The communications device may be wireless, i.e., it may be enabled to communicate wirelessly in the communications network 500, sometimes also referred to as a cellular radio system or cellular network. The communication may be performed e.g., between two communications devices, between the communications device and a regular telephone and/or between the communications device and a server. The communication of the communications device may be performed e.g., via a RAN and possibly one or more core networks, comprised within the communications network 500.

Any of the first communication node 511, the second communication node 512, the third communication node 513, and the fourth communication node 514 may have at least one of: half-duplex capability and duplex capability. In some particular embodiments, any of the first communication node 511, the second communication node 512, the third communication node 513, and the fourth communication node 514 may operate at half-duplex, as described above. In some particular embodiments, at least one of the the first communication node 511, the second communication node 512 and the third communication node 513 has only half-duplex capability.

In the following discussion a communication node is understood to refer to a node as any of the first communication node 511, the second communication node 512 and the third communication node 513, described below in reference to FIG. 6a and FIG. 6b.

The usage of the nomenclature first, second and third communication node is arbitrary and is only used to distinguish between the references to the communication nodes, according to an order, which may be an order of description herein.

Embodiments of a method performed by the first communication node 511 in communication with the second communication node 512, for performing one of transmission and reception to or from, respectively, the third communication node 513, will now be described with reference to the flowchart depicted in FIG. 7. The second communication node 512 is a receiver or transmitter of data from or to the first communication node 511 in a frame. The frame may be understood as the group of communication resources described earlier. Examples of the frame 800 according to embodiments herein, will be presented later in relation to FIGS. 8-10 and 13-14. The reference numbers used in reference to the frame 800 throughout the description of FIG. 7 refer therefore to those used in FIGS. 8-10 and 13-14. While frame is used herein, it may be understood that the same applies to e.g., a subframe. Therefore a reference to the frame 800 is understood herein to equally refer to a subframe. The frame 800 comprises at least one first set of time-frequency resources 801, and a second set of time-frequency resources 802, which may also be referred to herein as a first field and a second field, respectively. Examples of time-frequency resources are symbols, resource elements, OFDM symbols, Filter-Bank Multi-Carrier (FBMC) symbols, symbols of some of the type of multi-carrier modulation scheme, a set of any of the mentioned types of symbols, etc. . . . . The at least one first set of time-frequency resources 801 is reserved for communication of control information, and the second set of time-frequency resources 802 is reserved for communication of at least data information. As described above, control information may be e.g., channel state information, reception acknowledgement reports such as ACK/NACK reports, other types of feedback, Medium Access Control (MAC) messages, information about coding and modulation schemes used in associated data transmissions, other types of system link configuration messages, etc. . . . . Data information, as described above may be, e.g., payload data, which may in turn contain data information as well as control information for higher layers in the protocol stack. In some embodiments, the at least one first set of time-frequency resources 801 and the second set of time-frequency resources 802 are non-overlapping in time.

The first communication node 511, the second communication node 512 and the third communication node 513 operate in the communications network 500.

In some embodiments, the communications network 500 is one of: a wireless communications network 500 and a radio communications network 500. A wireless communications network may be understood herein as a network where at least some of the communication between nodes is performed over another medium than a wire, e.g., wireless optical communication, i.e., infrared light. A radio communications network is here a network where at least some communication is performed using electromagnetic waves at radio frequencies, transmitted over the air, via wire, or some other medium. Today's cellular telephony networks may hence be both, wireless communications networks and radio communications networks.

Figure 7:
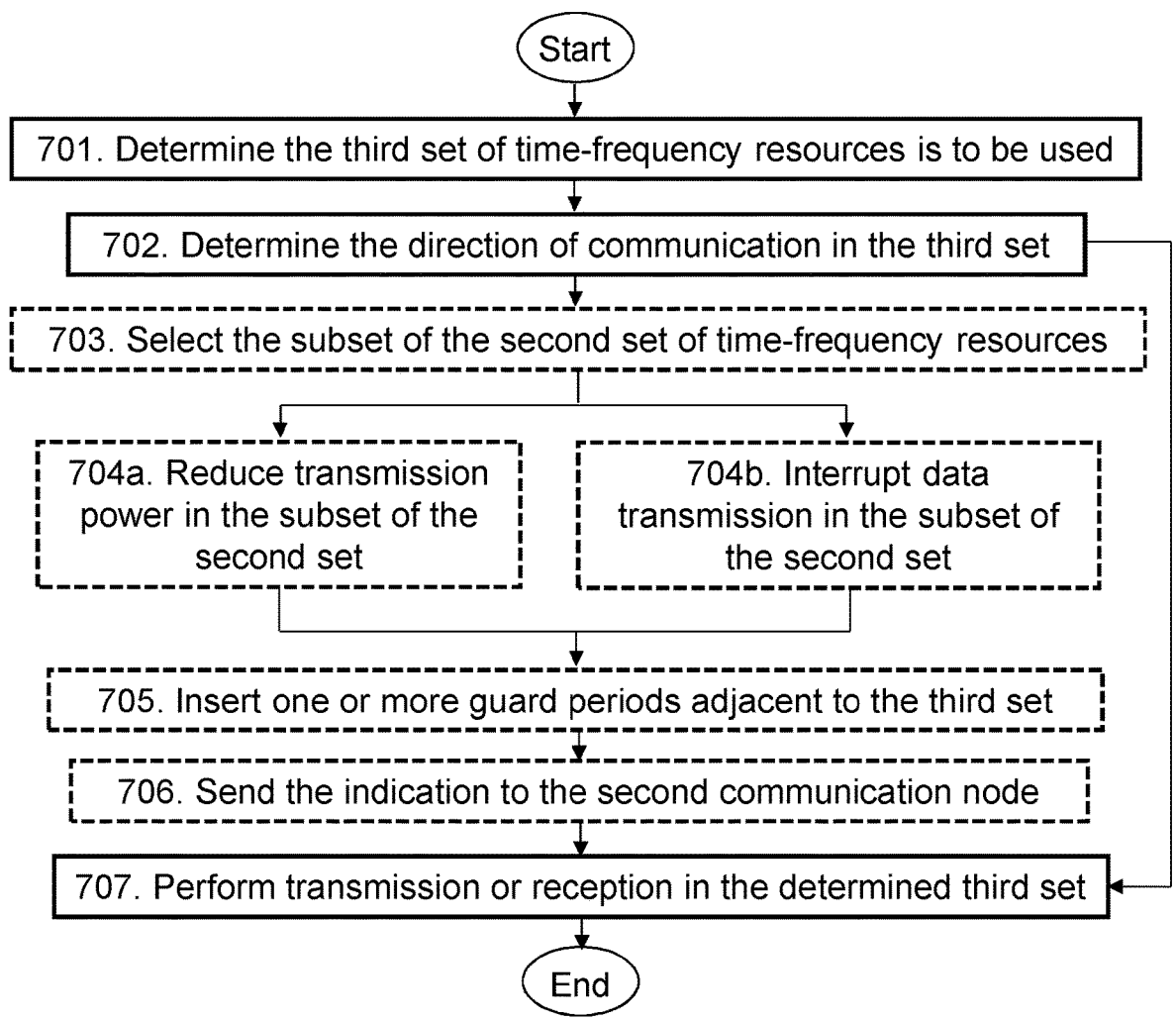
FIG. 7 is a schematic diagram illustrating embodiments of a method in a first communication node, according to some embodiments.

FIG. 7 depicts a flowchart of the actions that are or may be performed by the first network node 111 in embodiments herein. A dashed line depicts an optional action.

In some embodiments all the actions may be performed. In some embodiments, one or more actions may be performed. In some embodiments, the order of the actions illustrated in FIG. 7 may be changed in one or more actions. One or more embodiments may be combined, where applicable. All possible combinations are not described to simplify the description.

In some examples, transmission may be used an illustrative example of communication. However, any reference to transmission may be understood to also apply to reception.

Action 701

To understand the objective of the actions described herein, a scenario such as that illustrated in FIG. 4 may be considered as a starting point to be improved by the method according to embodiments herein. The first communication node 511, the second communication node 512, and third communication node 513 may each have a fixed tx and rx assignment for the first 801 and second 802 sets of time-frequency resources, e.g. fields, in the frame 800. In order to increase the flexibility in the exchange of information between communication nodes in the communications network 500, and allow for the first communication node 511, the second communication node 512, and third communication node 513 to exchange information with each other within a certain time window, e.g. within one frame 800 or within two frames 800, the first communication node 511 determines that a third set of time-frequency resources 803, e.g., a third field, is to be used for communication of information with the third communication node 513. The information is one of: control information, data information, and one or more signals related to one or more measurement procedures.

The determining action 701 performed by the first communication node 511 may in some embodiments herein relate to introducing an additional field to that or those comprised in the frame 800. The third set of time-frequency resources 803 may therefore also be referred to herein as the additional field, or the extra field. As stated earlier, the control and data fields may typically be non-overlapping. Non-overlapping sets of time-frequency resources should be understood to refer to sets of time-frequency resources that are configured by design, i.e., a priori, to have no overlap or at most a small overlap, e.g., below a certain threshold, in the time and frequency dimensions. That is, non-overlapping, or almost non-overlapping, sets of time-frequency resources may be a priori assigned to different sets of time-frequency resources. However, some interference between non-overlapping time-frequency resources may occur during communication, i.e., transmission or reception. Slight interference may also be present by design in some modulation schemes such as filter bank based modulation schemes. A modulation scheme is understood to refer to schemes such as OFDM, DFTS-OFDM, FBMC, etc, which may be also referred to as "multiplexing schemes", and not to so-called constellation types such as BPSK, QPSK, 16QAM, etc. . . . .

The additional field that may be introduced in some of the embodiments herein may be used either for transmission or reception. That is, the additional field may be understood as a flexible-duplex field.

By determining that the third set of time-frequency resources 803 is to be used for communication of information with the third communication node 513, the first communication node 511 may determine also which time-frequency resources may correspond, i.e., be assigned, to the third set.

Figure 8:
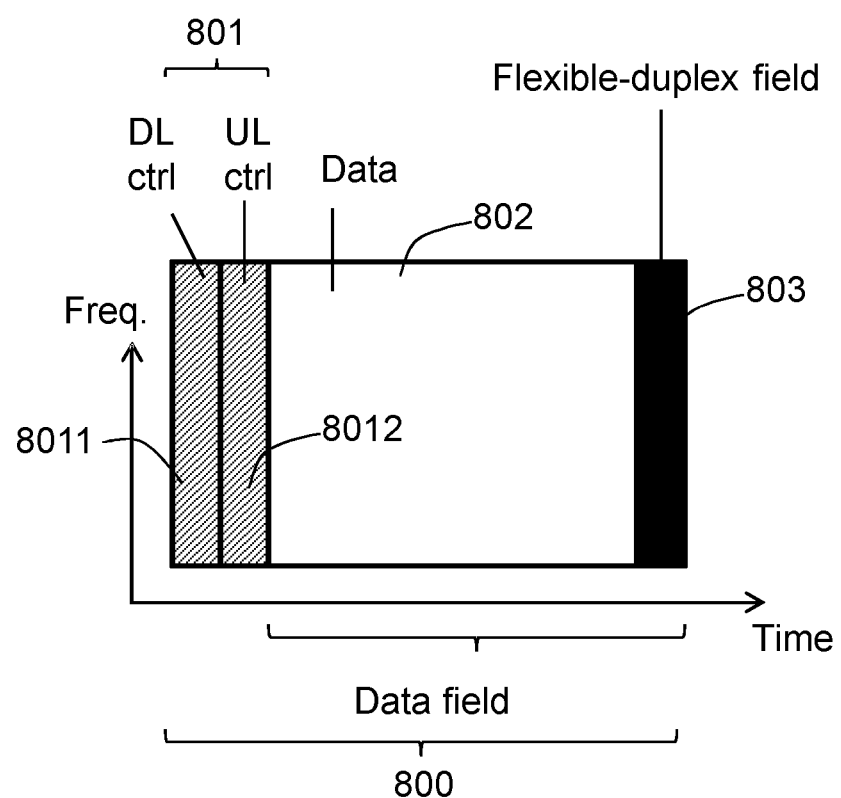
FIG. 8 is a schematic diagram illustrating a frame comprising one flexible-duplex field, according to some embodiments.

Embodiments Wherein the Third Set of Time-Frequency Resources 803 is Overlapping with Data Time-Frequency Resources The additional field that may be introduced may, in some of the embodiments herein, overlap in time and frequency with parts of the data field. The flexible-duplex field may be used either for transmission or reception independently of the tx/rx direction of the other fields in the frame 800, e.g., the other three, fields in the frame 800. FIG. 8 is a schematic diagram illustrating a frame 800 comprising one such flexible-duplex field. In the non-limiting example of FIG. 8, the frame 800 comprises two first sets of time-frequency resources 8011, 8012, wherein one first set of time-frequency resources 8011 is a DL control field, and the other first set of time-frequency resources 8012 is an UL control field. The frame 800 also comprises a data field, that is, the second set of time-frequency resources 802, and the flexible-duplex field, that is, the third set of time-frequency resources 803, which is located at the end of the frame 800, and is indicated in FIG. 8 by a solid black field. The additional field may typically not be used in every frame 800.

Embodiments herein may therefore relate to an overlapping field with flexible duplex, in which case the additional field may be said to be punctured into the data field, as explained later, in relation to Action 704.

Although in general the additional field may in principle appear at any time location in the frame 800, in one embodiment such as that illustrated in FIG. 8, it may be placed at the end of the frame 800 so as to minimize the number of tx/rx direction switches in a frame 800, which may be valuable because of the extra guard period that may be needed for tx/rx direction.

The additional field may overlap, also or solely, with a non-data field of the frame 800.

It should be noted that the exact same effects as described here may also be obtained using slightly different terminology; for example, the additional field may be said not to overlap with the data field but rather to replace part of it.

The additional field may contain control signaling, or possibly reference signals, or some other type of information. It may target a different receiver/transmitter communication node than the other fields of the frame 800, and if the communication node is capable of adaptive beamforming, a different beam direction may be used compared to the other fields.

Embodiments Wherein the Third Set of Time-Frequency Resources 803 is Placed Between Two Frames 800

In other embodiments, the third set of time-frequency resources 803 is placed between two frames 800 of time-frequency resources, e.g., wherein at least the first frame 800 of the two frames 800 comprises the first set of time-frequency resources 801, and the second set of time-frequency resources 802.

Figure 9:
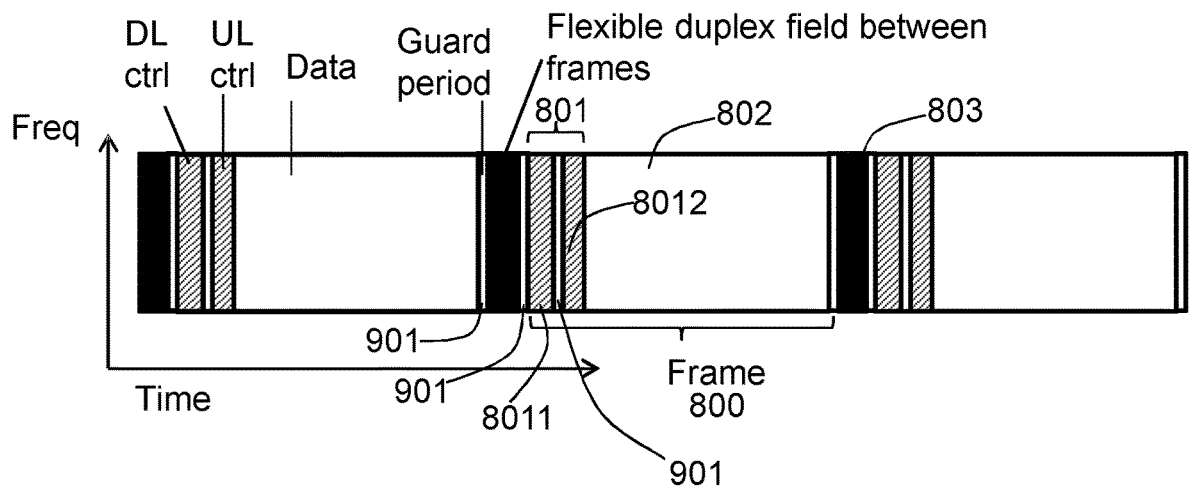
FIG. 9 is a schematic diagram illustrating a flexible duplex field, according to some embodiments.

Thus, embodiments herein may relate to inserting between frames 800 an additional or extra field, whose tx/rx direction may be selected arbitrarily, independently of the tx/rx directions inside the regular frame 800. By placing the extra field in-between frames 800, where a switch in tx/rx direction may anyway occur, the need for extra guard periods is minimized. This is illustrated in FIG. 9. FIG. 9 is a schematic diagram illustrating a flexible duplex field, that is, the third set of time-frequency resources 803, according to embodiments herein. Three different frames 800 are depicted in FIG. 9, with similar structure. Each frame 800 in FIG. 9 comprises the at least one first set of time-frequency resources 801, and the second set of time-frequency resources 802. In this particular example, each frame 800 comprises two first sets of time-frequency resources 8011, 8012, wherein one first set of time-frequency resources 8011 is a DL control field, and the other first set of time-frequency resources 8012 is an UL control field. The third set of time-frequency resources 803 is placed in between frames 800, as indicated by the solid black rectangles. Each third set of time-frequency resources 803 in FIG. 9 is placed with guard period 901 on each side, as indicated by the thin white rectangles. Note the first guard period of the third set of time-frequency resources 803 is not depicted. In the particular example of FIG. 9, a guard period 901 is also placed between the two first sets of time-frequency resources 8011, 8012. The tx/rx direction of the extra field may be pre-agreed between communication nodes, or an individual communication node may take an autonomous decision to change tx/rx direction, e.g., to transmit broadcast information to a set of communication nodes, or to listen to broadcast information from some other communication node. In particular, if a communication node has spatial beamforming capabilities, it may for the extra field use a different beam direction, e.g., a different precoder. The extra control field may consist of one or multiple symbols.

Some embodiments herein may therefore relate to a flexible-duplex field between frames 800. In particular, embodiments herein may relate to an extra control field, preferably placed between frames 800, for which the tx/rx direction may be dynamically changed. The flexible-duplex field, may also be referred to herein as the third set of time-frequency resources 803, an extra field, or an additional field.

In some embodiments, the control field is not used for control signaling to and/or from the communication nodes with which there is currently data communication ongoing, since then the normal control fields may be used instead.

The third set of time-frequency resources 803 may not be inserted in between every pair of frames 800. When present, the third set of time-frequency resources 803 may not always be used.

Note that exactly the same effect may be achieved with slightly different terminology, e.g., the extra field may be said to belong to one of the frames 800, either the preceding or the following frame 800.

Action 702

Once the first communication node 511 has determined that the third set of time-frequency resources 803 is to be used for communication of information with the third communication node 513, the first communication node 511 determines a direction of communication in the third set of time-frequency resources 803. The direction of communication is one of transmission and reception. The determining of the direction of communication in this action is done in such a way that the direction of communication in the third set of time-frequency resources 803 is based on the information to be communicated, that is, based on whether the information to be communicated is control information, data information or one or more signals related to one or more measurement procedures. This is so the determined direction of communication may adapt to the needs of the information to be communication to the third communication node 513.
Information is Related to One or More Measurement Procedures For example, in the embodiments wherein the information being communicated is one or more signals related to one or more measurement procedures, the direction of communication is opposite to a direction of communication in the second set of time-frequency resources 802, wherein the direction of communication in the second set of time-frequency resources 802 is one of transmission and reception. This may allow the first network node 511 to transmit one or more measurement signals for one or more measurement procedures within a time period when the first communication node 511 is receiving data, or to receive one or more signals for one or more measurement procedures within a time period when the first communication device 511 is transmitting data.

Information is Related to Control Information or Data Information

In the embodiments wherein the information being communicated is one of: control information and data information, the direction of communication is one of: independent of a direction of communication in the first set of time-frequency resources 801, and based on the direction of communication in one or more of: the first set of time-frequency resources 801 and the second set of time-frequency resources 802.

For example, in some particular embodiments wherein the third set of time-frequency resources 803 in the frame 800 is to be used for communication of control information, the direction of communication in the third set of time-frequency resources 803 in the frame 800 may be opposite to the direction of communication in the second set of time-frequency resources 802 in the frame 800. This may allow the first network node 511 to transmit e.g., control information within a time period when the first communication node 511 is receiving data, or to receive e.g., control information within a time period when the first communication device 511 is transmitting data.

In embodiments wherein the information in the third set of time-frequency resources 803 is at least one of: control information and data information, the determining of the direction of communication in the third set of time-frequency resources 803 may be independent or based on the direction of transmission or reception in the first set of time-frequency resources 801.

According to the foregoing, in some of these embodiments wherein the information in the third set of time-frequency resources 803 is at least one of: control information and data information, the tx/rx direction of the extra field, that is, in the third set of time-frequency resources 803, is not fully independent of the tx/rx direction of the fields in the adjacent frames 800. For example in embodiments wherein the first set of time-frequency resources 801 comprise a first and a second control fields, the extra field may be selected based on the tx/rx direction of the first control field in the following frame 800; for a specific example, it may be set to the tx/rx direction that allows a given communication node to communicate with as many neighbor communication nodes as possible.

In some embodiments, the tx/rx direction of the extra field is based on the current frame 800 number, e.g., time stamp, and/or an AN identifier number according to some rule that ensures rather frequent opportunities for neighboring nodes to exchange control information. As a specific example, the communication nodes may use a pseudo-random binary sequence with a seed computed based on the AN identifier number. Thus, in some embodiments, the determining the direction of communication in the third set of time-frequency resources 803 is based on one of: a current frame 800 number and a current communication node identifier.

In some embodiments, the direction of communication in the third set of time-frequency resources 803 in the frame 800 is opposite to the direction of communication in the second set of time-frequency resources 802 in the frame 800, the direction of communication being one of transmission and reception.

Action 703

In some embodiments, the third set of time-frequency resources 803 corresponds to a subset of the second set of time-frequency resources 802. The first communication node 511 may then select the subset of the second set of time-frequency resources 802 that is to correspond to the third set of time-frequency resources 803. In some of these embodiments, the third set of time-frequency resources 803 is to be used for communication of one or more measurement procedures. In this action, the first communication node 511 may select the subset of the second set of time-frequency resources 802 that is to be used to perform the one or more measurement procedures.

In some embodiments, the selecting the subset of the second set of time-frequency resources 802 is performed pseudo-randomly. This will be explained further in the next action.

In other embodiments, the selecting the subset of the second set of time-frequency resources 802 is based on one of: a parameter specific to the first communication node 511, e.g. the communication node identity, a time when at least the third communication node 513 operating in the communications network 500 transmits one or more reference signals, and a frequency where at least the third communication node 513 transmits one or more reference signals. The selecting of the subset based on the time or the frequency may be made in order to be able to perform more effective measurements. That is, in order to be able to e.g., measure a signal transmitted by the third communication node 513.

In some embodiments wherein the third set of time-frequency resources 803 corresponds to a subset of the second set of time-frequency resources 802, the third set of time-frequency resources 803 is to be used for communication of control information.

Action 704

As stated earlier, the third set of time-frequency resources 803 may, in some embodiments, overlap in time and frequency with parts of the data field in the frame 800. In frames 800 where the additional field is being used, it may, depending on hardware capabilities, not be possible for a communication node such as the first communication node 511 to maintain data reception/transmission in the part of the frame 800 that overlaps with the additional field, i.e. the additional field may be said to be punctured into the data field, that is, replacing/stealing one or more symbols. Different ways of coping with this interruption in the data communication are covered in various embodiments.

In some embodiments, wherein the third set of time-frequency resources 803 corresponds to a subset of the second set of time-frequency resources 802, the first communication node 511 may in this action, interrupt data communication in the subset of the second set of time-frequency resources 802. This may be done, for example to perform the one or more measurement procedures, the one or more measurement procedures being performed on one or more signals to or from the third communication node 513.

For example, the one or more signals may be from the third communication node 513 or the first communication node 511 may transmit one or more signals to the third communication node 513. This is indicated in FIG. 7 as Action 704*a*.

In some embodiments, the one or more signals are of a communication between the third communication node 513 and the fourth communication node, as may be seen in FIG. 6*b*.

Figure 10:
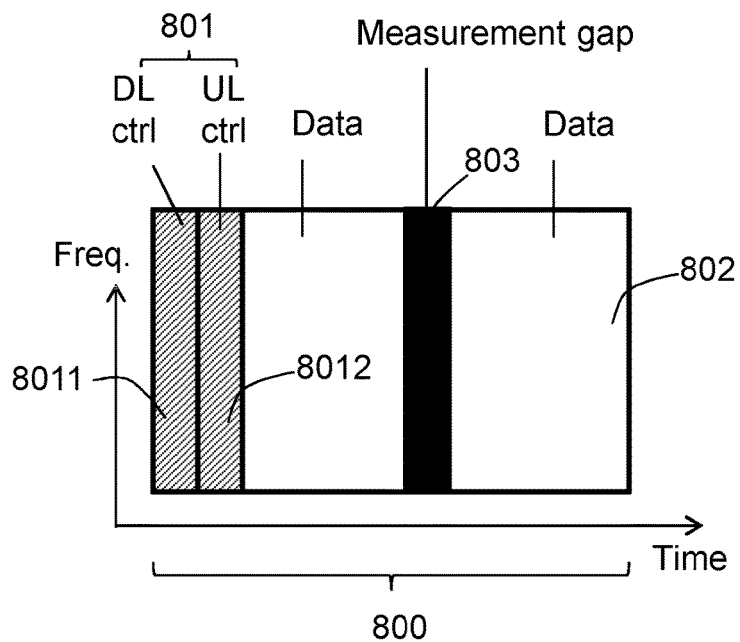
FIG. 10 is a schematic diagram illustrating a measurement gap, according to some embodiments.

Some embodiments herein may therefore relate to a flexible-duplex measurement gap, as illustrated in FIG. 10. FIG. 10 is a schematic diagram illustrating a measurement gap according to embodiments herein. In the non-limiting example of FIG. 10, the frame 800 comprises the at least one first set of time-frequency resources 801, and the second set of time-frequency resources 802, a data field. One first set of time-frequency resources 8011 is a DL control field, and the other first set of time-frequency resources 8012 is an UL control field. The flexible-duplex measurement field, that is, the third set of time-frequency resources 803, is located in the middle of the data field.

Several variations of this embodiment are discussed in the following description, e.g. the location in time of the short interruption may be pseudo-randomly selected.

The reason for a communication node A, such as the first communication node 511, wishing to interrupt reception for a short time period in order to more efficiently perform measurements of interference etc from other communication nodes in the communication network 500 may, e.g be that the first communication node 511 is capable of adaptive beamforming, but may only listen in one direction at a time, and therefore wishes to steer its receiving beam in a different direction during the time period. This is typically the case if analog beamforming is used.

In one example, the time location of the measurement gap within the frame 800 is pseudo-randomly, or randomly, selected. The advantage of a random selection is that then, even without pre-agreement and/or co-ordination, neighboring communication nodes may be unlikely to have the measurement gaps at the same time, at least for a prolonged time. This reduces the risk of attempting to measure interference from another communication node when that communication node is interrupting its own transmission in order to measure interference. The pseudo random position of the measurement gap may be derived from a communication node specific parameter, e.g. the communication node identity.

In another example, the measurement gap is intentionally placed at a point in time where neighboring communication nodes, such as the third communication node 513, transmit some kind pilot signals, such as reference signals, in order to be able to perform more effective measurements. Different communication nodes may then preferably transmit orthogonal pilot signals. In this case, the measurements may not need to necessarily concern interference from another link, but may alternatively concern link quality that may be achieve if receiving from the neighboring communication node, e.g., the third communication node 513 that transmits the pilot signals, as illustrated in e.g., FIG. 6*b*.

For example, in other embodiments, when transmitting data, the first communication node 511 may interrupt its data transmission to transmit control information in the overlapping control field to some other communication node, e.g., using multi-antenna beamforming towards another communication node than the one receiving data, without the receiving communication node being aware of this interruption. Instead, Forward Error Correction (FEC) coding may be preferably made robust enough to allow the receiving communication node to decode correctly the data field anyway.

In one embodiment, when receiving data, the first communication node 511 may interrupt its data reception in the additional field in order to listen to control signaling from some other communication node, possibly using a different beam direction. Such interruption may be necessary if attempting to receive the additional field from a different direction than the data in a communication node that is only capable of analog beamforming/fixed beams, that is e.g., in a communication node that is only capable of listening in one direction at a time.

In one alternative embodiment, indicated in FIG. 7 as Action 704*b*, data transmission may not be completely interrupted, but rather only the transmit power may be reduced in order to free some of the available transmit power of the communication node to be used for the additional field. Transmit power is understood to refer herein to a communication power, that is a power of either one of transmission or reception. Alternatively, the communication node may transmit with full power on some subcarriers, but use other subcarriers for transmission of the additional field.

In one embodiment, only one of two, or more, Multiple Input Multiple Output streams (MIMO) streams is interrupted to instead transmit the additional field. That it, in some embodiments wherein the first communication node 511 uses MIMO, the first communication node 511 may interrupt data communication in the subset of the second set of time-frequency resources 802 corresponding to the third set of time-frequency resources 803, wherein the interrupting is only on a subset of available MIMO streams.

Action 705

In some embodiments, the direction of communication in the third set of time-frequency resources 803 determined by the first communication node 511 in Action 702 may represent a change of direction with respect to the time-frequency resources immediately prior to the third set of time-frequency resources 803. Since, as explained earlier, switching of tx/rx direction may take some time, and may require an extra guard period between adjacent symbols that belong to fields with different duplex direction, in this action, the first communication node 511 may insert one or more guard periods adjacent in time to the third set of time-frequency resources 803, according to the determined direction of communication in the third set of time-frequency resources 803, as needed. Thus, this action may be performed when a switch of tx/rx direction is necessary to perform one of transmission or reception in the third set of time-frequency resources 803.

Action 706

In some embodiments, the first communication node 511 may communicate to the second communication node 512, the communication node which is the receiver of its data, e.g., using one of the normal control fields, the location and/or presence of the additional field in a frame 800 in order to allow it to avoid attempts to demodulate or otherwise use signals received during the additional field in the data decoding process.

Thus, in this action, the first communication node 511 may send an indication to the second communication node 512. The indication is of a location and or usage of the third set of time-frequency resources 803 in the frame 800. As stated earlier, the second communication node 512 operates in the communications network 500. The second communication node 512 may be a receiver or transmitter of data in at least a frame 800 from the first communication node 511.

The sending may be implemented, e.g., by sending a message particularly intended for such indication, or by piggybacking such an indication onto another control-signaling message. The indication of the location may, e.g., be expressed in terms of OFDM symbol number within a subframe 800. An indication of usage of the third set of time-frequency resources 803 may be expressed, e.g., in terms of a single bit, where 1 denotes that the field is used, and 0 denotes that the field is not used. The indication of the usage may comprise an indication that the usage is zero, that is, that the third set of time-frequency resources 803 in the frame 800 is not used.

In some embodiments, the first communication node 511 communicates to the second communication node 512, its data receiver, e.g. using one of the normal control fields, the location of the measurement gap in order to allow it to avoid attempts to demodulate or otherwise use signals received during the measurement gap in the data decoding process.

In some embodiments, a communication node A, such as the second communication node 512, that is receiving data from a communication node B, such as the first communication node 511, may be aware that the communication node B may insert a measurement gap in a frame 800 and may use receiver algorithms that account for this. In another embodiment, the communication node A knows even which symbol(s) of a frame 800 the communication node B may use for a measurement gap, e.g. defined according to some pseudo-random sequence specifying for each frame 800 which symbols are eligible for measurement gaps in communication node B, but still does not know whether that symbol(s) is actually a measurement gap in the frame 800 in question. In yet another embodiment, communication node B may signal to communication node A that at least one symbol will be used for measurement gap in a specific frame 800, but does not reveal which symbol in the frame 800, this may be useful if the amount of control signaling that may be transmitted from communication node B to communication node A is limited. Other levels of detail in the specification of where/if a measurement gap occurs may also be possible.

In some embodiments, one or both of the communication nodes of a communication link are unaware of the existence and/or time location of a measurement gap in the other communication node of the communication link. In the case where the receiving communication node is unaware of the measurement gap in the transmitter, it may have to rely on, e.g., robust forward error correction (FEC) or hybrid ARQ to anyway decode the data.

Action 707

In some embodiments, the first communication node 511 performs one of transmission or reception to or from, respectively, the third communication node 513 in the determined direction of communication, according to Action 702. The performing of the one of transmission or reception is in the third set of time-frequency resources 803 determined to be used for communication of information with the third communication node 513, according to Action 701.

Figure 11:
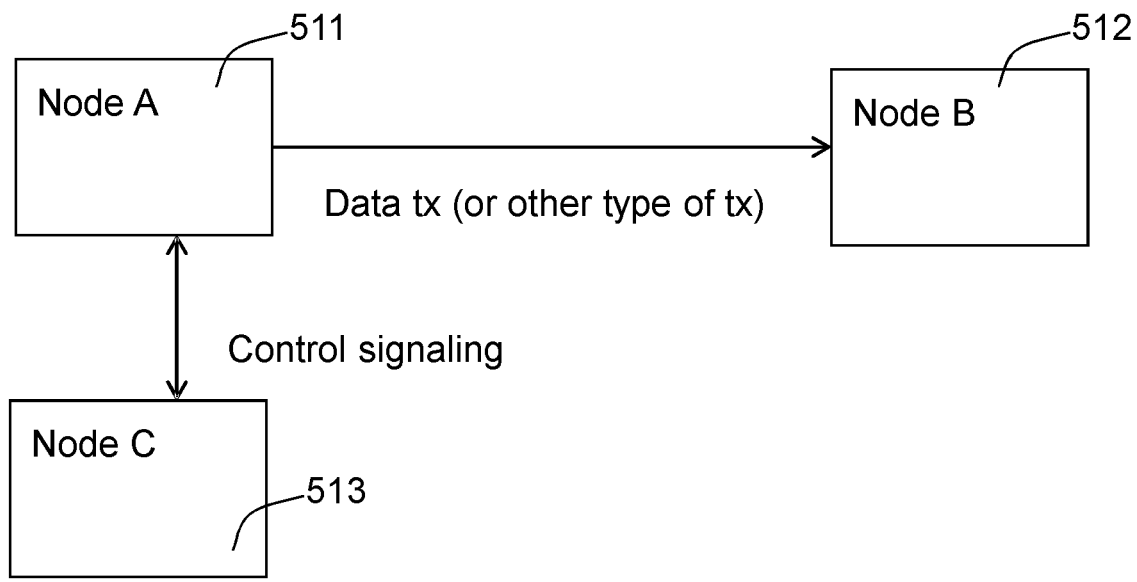
FIG. 11 is a schematic diagram illustrating embodiments of a method in a first communication node, according to some embodiments.

An example of the above is illustrated in FIG. 11, wherein the third set of time-frequency resources 803 overlap with the data field. A communication node B, such as the second communication node 512, receiving data from a communication node A, such as the first communication node 511, may attempt to demodulate data during the period, e.g., symbols, where the communication node A instead communicated only the additional field, but also attempts to demodulate the additional field. The communication node A may communicate the additional field comprising control information or signalling to a Node C, such as the third communication node 513. The demodulation and subsequent decoding of the additional field may likely succeed, and if the data field was strongly enough encoded, the decoding of the data may also succeed.

Figure 12:
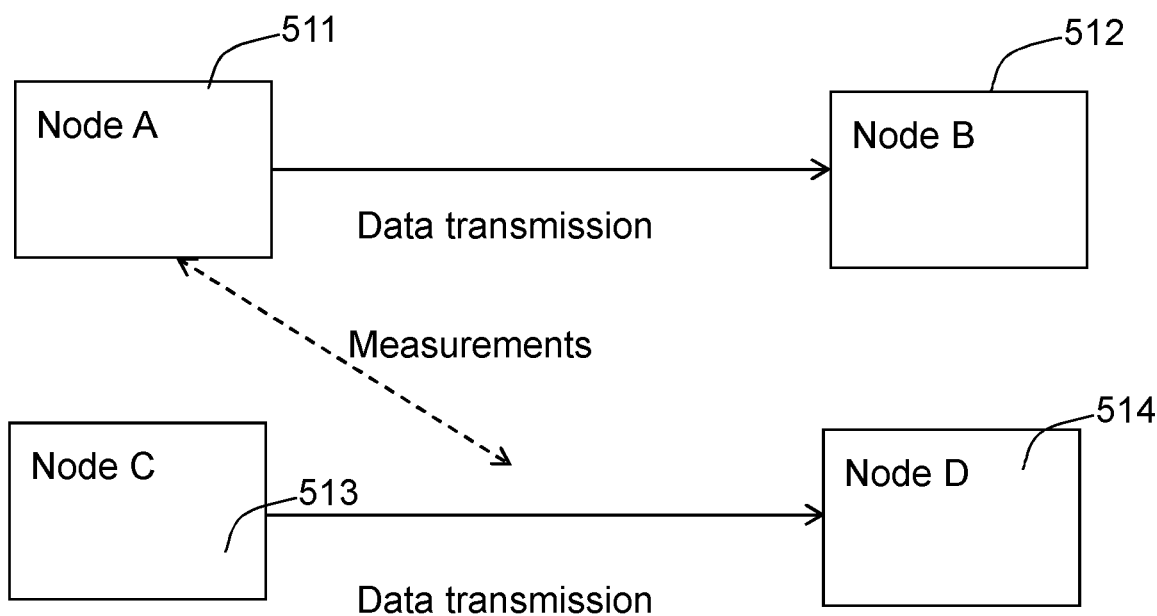
FIG. 12 is a schematic diagram illustrating embodiments of a method in a first communication node, according to some embodiments.

FIG. 12 is a schematic diagram illustrating another example of some embodiments herein, wherein the information being communicated is related to one or more measurement procedures. Such embodiments herein refer to allowing a communication node A, such as the first communication node 511, to interrupt data communication with a communication node B, such as the second communication node 512, i.e., tx to B or rx from B, for a short time period within the data field, in order to participate in measurement procedures, either measure interference or other signal from some other communication node(s) in the communication network 500, or transmit measurement signals to other communication nodes, such as a for example, measuring one or more signals in a communication, e.g., a data transmission, between a Node C, such as the third communication node 513, and a Node D, such as the fourth communication node 514, as illustrated in the example of FIG. 12. The interruption may be referred to as a measurement gap, measurement field or measurement period, which corresponds to the subset of a second set of time-frequency resources 802. This differs from some methods used in WCDMA and LTE, where a communication node may interrupt data transmission to a communication node in order to let that communication node perform measurements.

In some embodiments, the third communication node 513 is different from the second communication node 512 operating in the communications network 500, the second communication node 512 being a receiver or transmitter of data in the second set of time-frequency resources 802.

The first communication node 511 may be different than the third communication node 513. In some embodiments, the second communication node 512 and the third communication node 513 may be the same node. In some other embodiments, the second communication node 512 may be different than the third communication node 513. The third communication node 513 is in some embodiments the same communication partner as the one of any of first set of time-frequency resources 801 in a or the frame 800 and the second set of time-frequency resources 802 in a or the frame 800. The third communication node 513 is in some embodiments a different node than the communication partner of the one of any of first set of time-frequency resources 801 in a or the frame 800 and the second set of time-frequency resources 802 in a or the frame 800.

In some embodiments, the first communication node 511 is different than the second communication node 512. In some embodiments, the second communication node 512 and any of the third communication node 513 and the fourth communication node 514 may be the same node. In some other embodiments, the second communication 512 node may be different than any of the third communication node 513 and the fourth communication node 514 may be the same node. Any of the third communication node 513 and the fourth communication node 514 may be, in some embodiments, the same communication partner as the one of any of the at least one first set of time-frequency resources 801 and the second set of time-frequency resources 802 in a or the frame 800. Any of the third communication node 513 and the fourth communication node 514 may be, in some embodiments, a different communication node than the communication partner of the one of any of the at least one first set of time-frequency resources 801 and the second set of time-frequency resources 802 in a or the frame 800.

Beamforming may be applied to any tx signal, as well as to any rx signal. Different beamforms may target the same communication node or, more often, different communication nodes. Beamforming may be achieved using different antennas directed in different spatial directions, or using the same, or partly overlapping, sets of multi-antenna elements with different precoder settings, that is, different precoder weights. Beamforms are in general not restricted to a single narrow lobe, but may have more complex shapes, depending on the precoder. The precoders are typically linear, in which case they may be described in terms of a set of precoder weights, but may in principle also be non-linear.

An advantage of embodiments herein is that they enable communication nodes in a communications network with half-duplex restrictions to efficiently exchange control signaling with each other.

Figure 13:
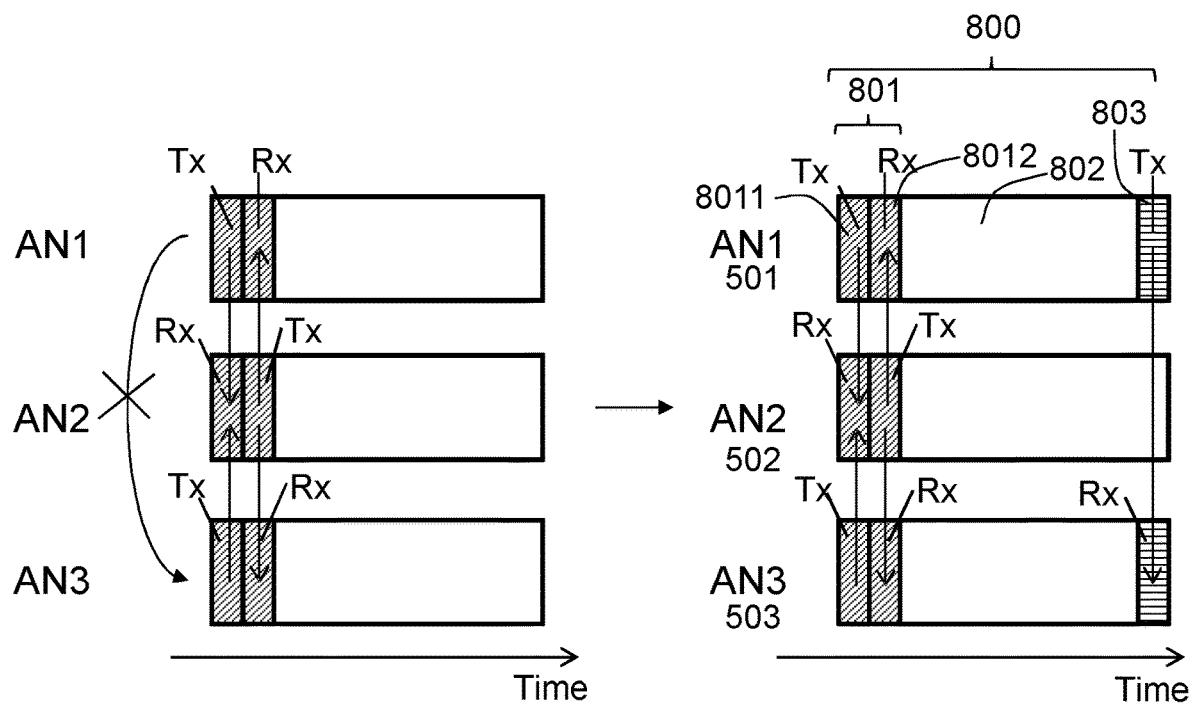
FIG. 13 is a schematic diagram of a comparison of an embodiment of a method in a first communication node, according to embodiments herein, right side, with an example of existing methods, left side.

FIG. 13 is a schematic diagram illustrating an example of an effect that may be achieved with a method in the first communication node 511, according to an embodiment herein, right side, in comparison with an example of an existing method, left side. An exemplary frame 800 is represented for each one of the nodes in the left and right diagrams. In particular, FIG. 13 illustrates, with a particular example, how embodiments herein, illustrated in the right schematic diagram, may provide for a way for three ANs, AN1, such as the first communication node 511, AN2, such as the second communication node 513 and AN3, such as the third communication node 513, to communicate with each other. Communication is in a context where each frame 800 comprises two first sets of time-frequency resources 801 represented by rectangles with diagonal stripes: one first set of time-frequency resources 8011, another first set of time-frequency resources 8012, and wherein each of the two first sets of time-frequency resources have a fixed assignment, as indicated in FIG. 13, with "Tx" or "Rx". The schematic diagram on the left illustrates such a scenario according to existing methods. AN1 and AN3 have fixed assignments of transmission for one of the two first sets of time-frequency resources, the one on the left, while the AN2 has a fixed assignment of reception. AN1 and AN3 have fixed assignments of reception for the other one of the two first sets of time-frequency resources, the one on the right, while the AN2 has a fixed assignment of transmission. Under such fixed assignment, AN1 cannot transmit to AN3 through the two first sets of time-frequency resources, as indicated with the crossed arrow. This is because AN1 and AN3 transmit both at the same time, or receive both at the same time. The schematic diagram on the right illustrates a similar scenario, according to an embodiment herein. AN1 and AN3 have fixed assignments of transmission for one of the two first sets of time-frequency resources 8011, while the AN2 has a fixed assignment of reception. AN1 and AN2 have fixed assignments of reception for the other one of the two first sets of time-frequency resources 8012, while the AN2 has a fixed assignment of transmission. However, in the schematic diagram on the right, both of AN1 and AN3 have the third set of time-frequency resources 803, represented by the rectangles with horizontal stripes. In this particular example, the third set of time-frequency resources 503 are a subset of the second set of time-frequency resources 802. Thanks to the flexible third set of time-frequency resources 803, AN1 may now transmit, e.g., control information, to AN3, which may receive the information transmitted by AN1 during the frame 800.

Figure 14:
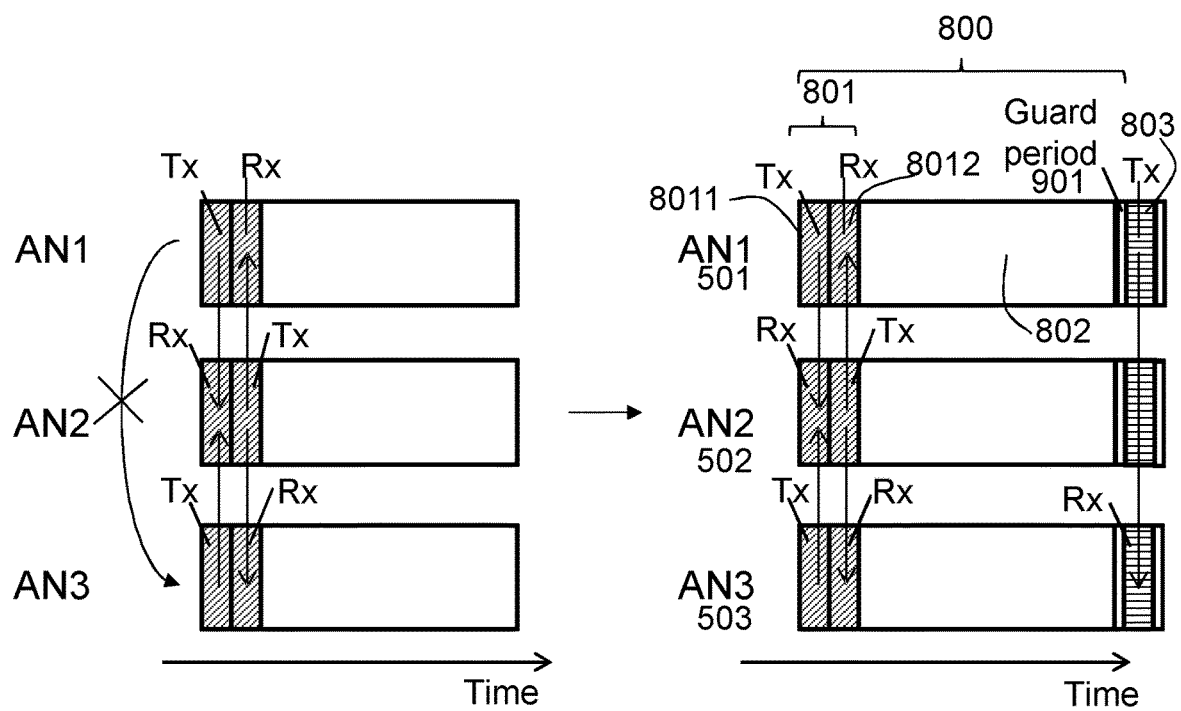
FIG. 14 is a schematic diagram of a comparison of an embodiment of a method in a first communication node, according to embodiments herein, right side, with an example of existing methods, left side.

FIG. 14 shows a similar schematic diagram to that of FIG. 13. FIG. 14 also illustrates an example of an effect that may be achieved with a method in the first communication node 511, according to an embodiment herein, right side, in comparison with an example of an existing method, left side. In the schematic diagram on the right, both of AN1, such as the first communication node 511, and AN3, such as the third communication node 513, have the third set of time-frequency resources 803, which is placed between two frames 800 of time-frequency resources, although only one of the frames 800 is shown to simplify the figure. Thanks to the flexible third set of time-frequency resources 803, AN1 may now transmit to AN3, which may receive the information transmitted by AN1. In the particular example shown, AN2 may also have a third set of time-frequency resources 803 being placed between two frames 800 of time-frequency resources, although in this particular example they are not used.

A further advantage of embodiments herein is that they enable communication nodes in a network with half-duplex restrictions to efficiently make measurements on transmission in other network links than the one currently being used for communication.

To perform the method actions described above in relation to FIGS. 7-14, the first communication node 511 configured to be in communication with a second communication node 512. The first communication node 511 is further configured to perform one of transmission and reception to or from, respectively, the third communication node 513. The first communication node 511 may comprise the following arrangement depicted in FIG. 15. As already mentioned, the second communication node 512 is configured to be a receiver or transmitter of data from or to the first communication node 511 in the frame 800. The frame 800 comprises at least the one first set of time-frequency resources 801, and the second set of time-frequency resources 802. The at least one first set of time-frequency resources 801 are reserved for communication of control information, and the second set of time-frequency resources 802 are reserved for communication of at least data information. The first communication node 511, the second communication node 512 and the third communication node 513 are configured to operate in the communications network 500.

The detailed description of some of the following corresponds to the same references provided above, in relation to the actions described for the first communication node 511, and will thus not be repeated here.

For example, the communications network 500 may be one of: the wireless communications network 500 and the radio communications network 500.

Also, the at least one first set of time-frequency resources 801 and the second set of time-frequency resources 802 may be configured to be non-overlapping in time.

The first communication node 511 is further configured to, e.g., by means of a determining module 1501 configured to, determine that the third set of time-frequency resources 803 is to be used for communication of information with the third communication node 513, wherein the information is one of: control information, data information, and one or more signals related to one or more measurement procedures.

The determining module 1501 may be a processor 1509 of the first communication node 511.

In some embodiments, the third set of time-frequency resources 803 is configured to be placed between two frames 800 of time-frequency resources.

The first communication node 511 is further configured to, e.g., by means of the determining module 1501 configured to, determine the direction of communication in the third set of time-frequency resources 803, the direction of communication being one of transmission and reception, wherein the direction of communication in the third set of time-frequency resources 803 is configured to be based on the information to be communicated.

In some embodiments, the direction of communication in the third set of time-frequency resources 803 in the frame 800 is opposite to the direction of communication in the second set of time-frequency resources 802 in the frame 800, the direction of communication being one of transmission and reception.

In some embodiments, the information configured to be communicated is one or more signals related to one or more measurement procedures, and the direction of communication is opposite to the direction of communication in the second set of time-frequency resources 802, wherein the direction of communication in the second set of time-frequency resources 802 is one of transmission and reception.

In some embodiments, the information configured to be communicated is one of: control information and data information, and the direction of communication is one of: independent of a direction of communication in the first set of time-frequency resources 801, and configured to be based on a direction of communication in one or more of: the first set of time-frequency resources 801 and the second set of time-frequency resources 802.

In some embodiments, to determine the direction of communication in the third set of time-frequency resources 803 is based on one of: the current frame 800 number and the current communication node identifier.

The first communication node 511 is further configured to, e.g., by means of a performing module 1502 configured to, perform one of transmission or reception to or from, respectively, the third communication node 513 in the determined direction of communication, wherein to perform the of the one of transmission or reception is configured to be in the third set of time-frequency resources 803 determined to be used for communication of information with the third communication node 513.

The performing module 1502 may be the processor 1509 of the first communication node 511.

In some embodiments wherein the third set of time-frequency resources 803 corresponds to a subset of the second set of time-frequency resources 802, the first communication node 511 may be further configured to, e.g., by means of an interrupting module 1503 configured to, interrupt data communication in the subset of the second set of time-frequency resources 802 to perform the one or more measurement procedures, the one or more measurement procedures being configured to be performed on one or more signals to or from the third communication node 513.

The interrupting module 1503 may be the processor 1509 of the first communication node 511.

In some embodiments, the first communication node 511 may be further configured to, e.g., by means of the interrupting module 1503 configured to, interrupt data communication in the subset of the second set of time-frequency resources 802 corresponding to the third set of time-frequency resources 803, wherein to interrupt is only on a subset of available Multiple Input Multiple Output streams.

The first communication node 511 may be further configured to, e.g., by means of a reducing module 1504 configured to, reduce transmission power in the subset of the second set of time-frequency resources 802 corresponding to the third set of time-frequency resources 803.

The reducing module 1504 may be the processor 1509 of the first communication node 511.

The first communication node 511 may be further configured to, e.g., by means of a selecting module 1505 configured to, select the subset of the second set of time-frequency resources 802 that is to be used to perform the one or more measurement procedures.

The selecting module 1505 may be the processor 1509 of the first communication node 511.

In some embodiments, to select the subset of the second set of time-frequency resources 802 is configured to be performed pseudo-randomly.

In some embodiments, to select the subset of the second set of time-frequency resources 802 is configured to be based on one of: the parameter specific to the first communication node 511, the time when at least the third communication node 513 configured to operate in the communications network 500 transmits one or more reference signals, and the frequency where at least the third communication node 513 transmits one or more reference signals.

In some embodiments, the third set of time-frequency resources 803 corresponds to a subset of the second set of time-frequency resources 802 and the third set of time-frequency resources 803 is to be used for communication of control information.

The first communication node 511 may be further configured to, e.g., by means of an inserting module 1506 configured to, insert one or more guard periods adjacent in time to the third set of time-frequency resources 803, according to the determined direction of communication in the third set of time-frequency resources 803.

The inserting module 1506 may be the processor 1509 of the first communication node 511.

The first communication node 511 may be further configured to, e.g., by means of a sending module 1507 configured to, send the indication to the second communication node 512 configured to operate in the communications network 500, the second communication node 512 being the receiver or transmitter of data in at least a frame 800 from the first communication node 511, the indication being of a location and or usage of the third set of time-frequency resources 803 in the frame 800.

The sending module 1507 may be the processor 1509 of the first communication node 511.

Other modules 1508 may be comprised in the first communication node 511.

Figure 15:
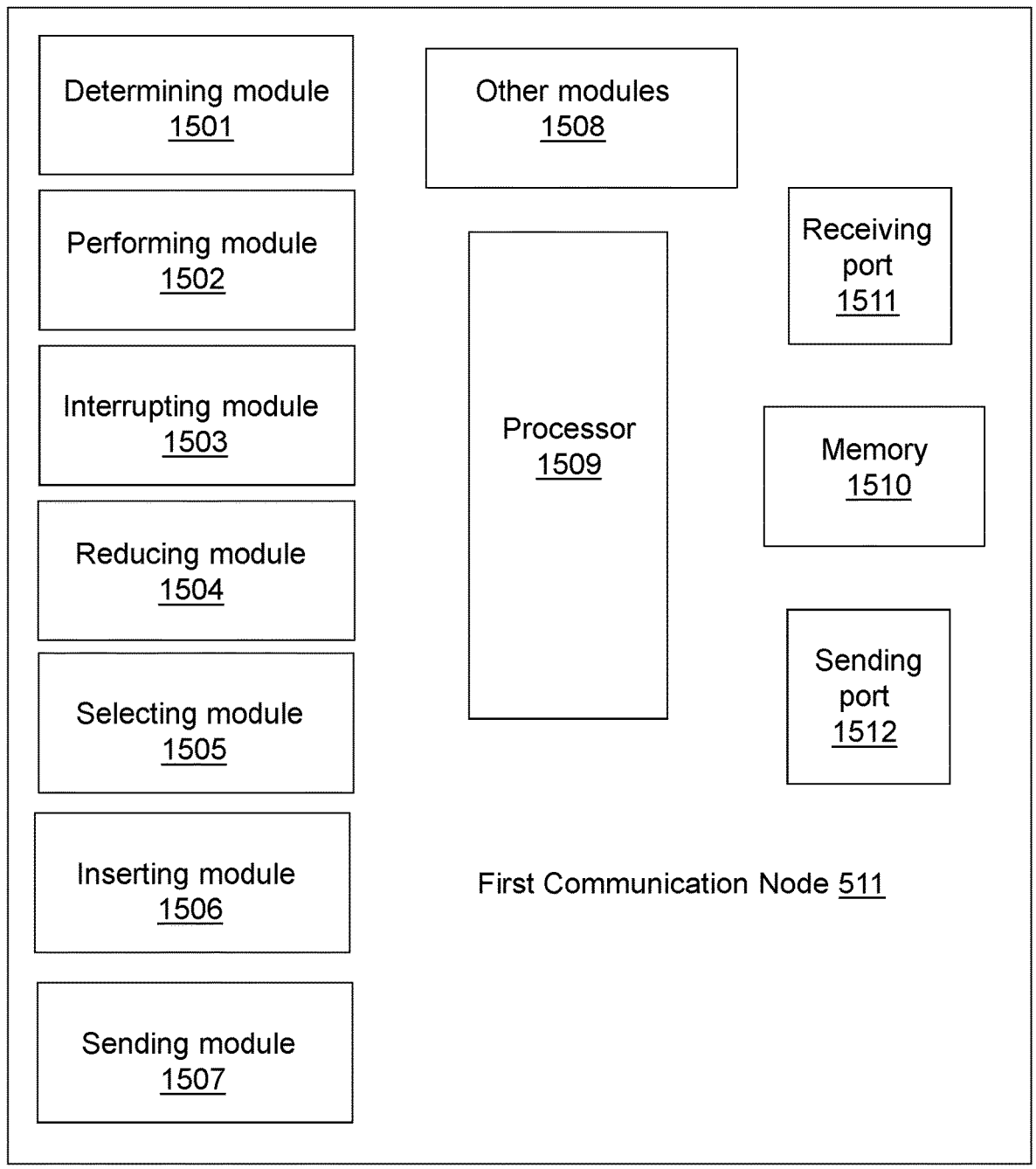
FIG. 15 is a block diagram of a first communication node that is configured according to some embodiments.
Figure 16:
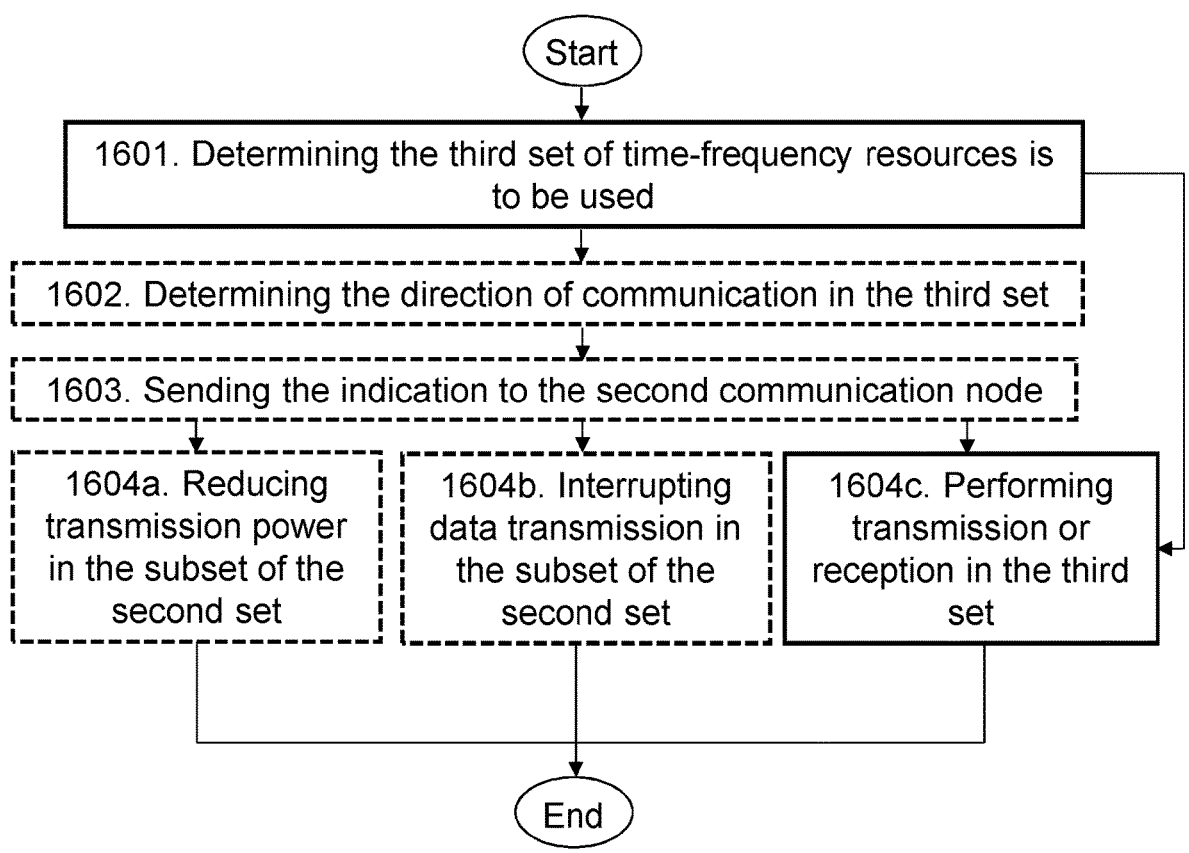
FIG. 16 is a schematic diagram illustrating actions of a method in a first communication node, according to some related examples.
Figure 17:
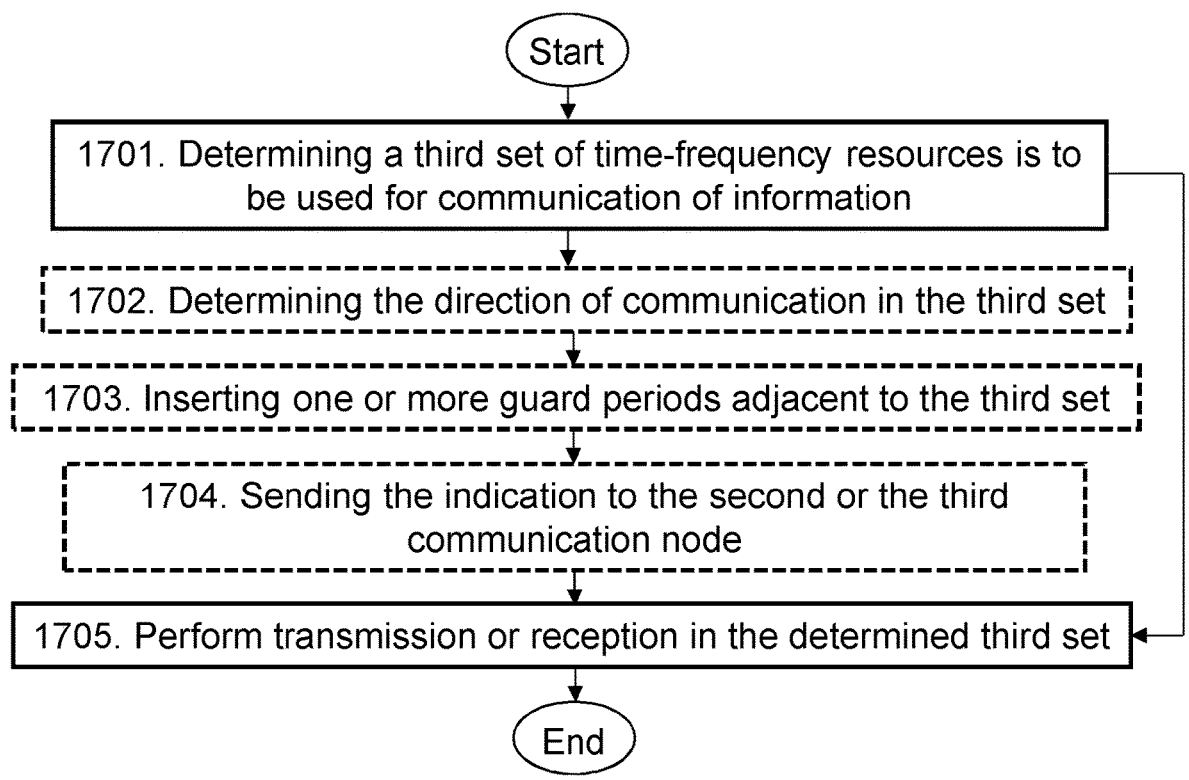
FIG. 17 is a schematic diagram illustrating actions of a method in a first communication node, according to some related examples.
Figure 18:
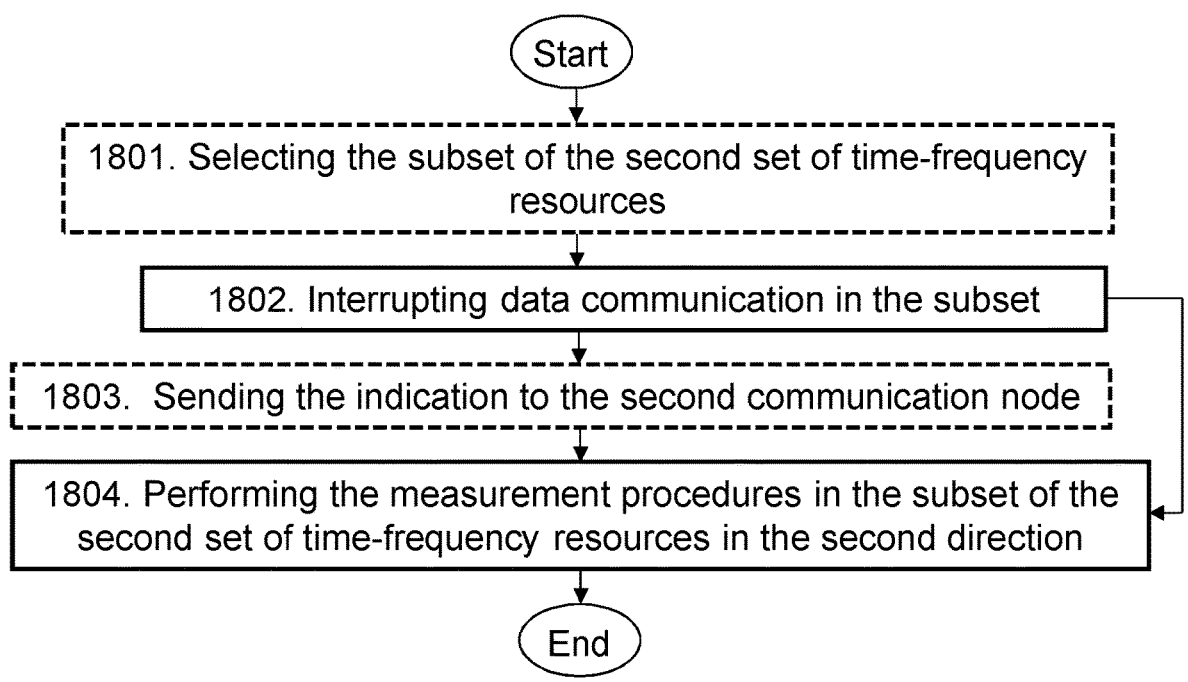
FIG. 18 is a schematic diagram illustrating actions of a method in a first communication node, according to some related examples.
Figure 19:
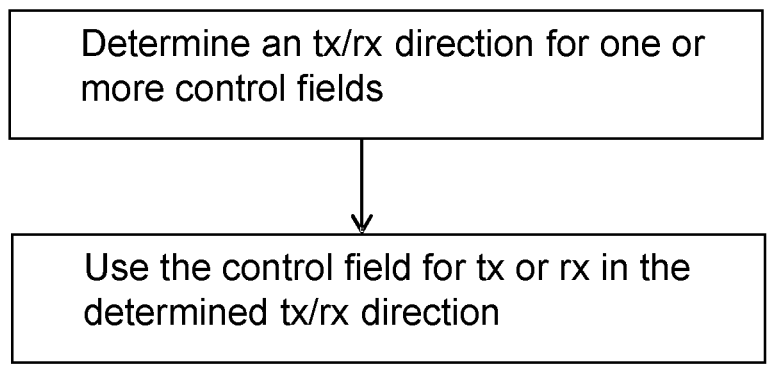
FIG. 19 is a schematic diagram illustrating actions of a method in a first communication node, according to some related examples.
Figure 20:
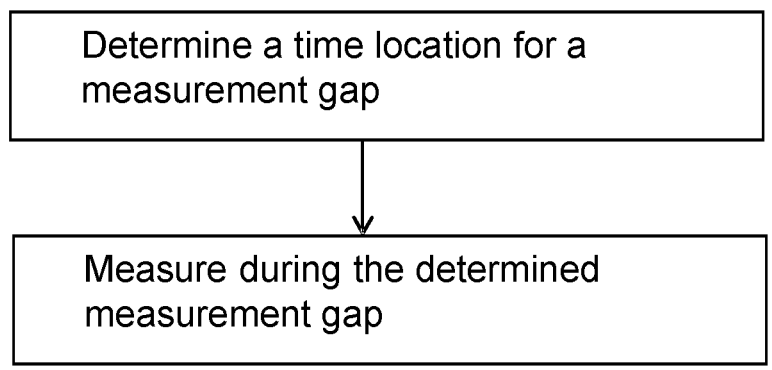
FIG. 20 is a schematic diagram illustrating actions of a method in a first communication node, according to some related examples.

The embodiments herein may be implemented through one or more processors, such as the processor 1509 in the first communication node 511 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the first communication node 511. One such carrier may be in the form of a CD ROM disc. It is however feasible with other data carriers such as a memory stick. The computer program code may furthermore be provided as pure program code on a server and downloaded to the first communication node 511. As indicated above, the processor 1509 may comprise one or more circuits, which may also be referred to as one or more modules in some embodiments, each configured to perform the actions carried out by the first communication node 511, as described above in reference to FIG. 15, e.g., the determining module 1501, the performing module 1502, the interrupting module 1503, the reducing module 1504, the selecting module 1505, the inserting module 1506, the sending module 1507, and other modules 1508. Hence, in some embodiments, the determining module 1501, the performing module 1502, the interrupting module 1503, the reducing module 1504, the selecting module 1505, the inserting module 1506, the sending module 1507, and other modules 1508 described above may be implemented as one or more applications running on one or more processors such as the processor 1509. That is, the methods according to the embodiments described herein for the first communication node 511 may be respectively implemented by means of a computer program product, comprising instructions, i.e., software code portions, which, when executed on at least one processor, cause the at least one processor to carry out the actions described herein, as performed by the first communication node 511. The computer program product may be stored on a computer-readable storage medium. The computer-readable storage medium, having stored thereon the computer program, may comprise instructions which, when executed on at least one processor, cause the at least one processor to carry out the actions described herein, as performed by the first communication node 511. In some embodiments, the computer-readable storage medium may be a non-transitory computer-readable storage medium, such as a CD ROM disc, or a memory stick. In other embodiments, the computer program product may be stored on a carrier containing the computer program, wherein the carrier is one of an electronic signal, optical signal, radio signal, or the computer-readable storage medium, as described above.

The first communication node 511 may further comprise a memory 1510 comprising one or more memory units. The memory 1510 may be arranged to be used to store obtained information, such as the information received by the processor 1509, store data configurations, schedulings, and applications etc. to perform the methods herein when being executed in the first communication node 511. Memory 1510 may be in communication with the processor 1509. Any of the other information processed by the processor 1509 may also be stored in the memory 1510.

In some embodiments, information e.g., from any of the second communication node 512 and the third communication node 513, may be received through a receiving port 1511. The receiving port 1511 may be in communication with the processor 1509. The receiving port 1511 may also be configured to receive other information.

The processor 1509 may be further configured to send messages, e.g., to any of the second communication node 512 and the third communication node 513, through a sending port 1512, which may be in communication with the processor 1509, and the memory 1510.

Those skilled in the art will also appreciate that the any module within the first communication node 511, e.g., the determining module 1501, the performing module 1502, the interrupting module 1503, the reducing module 1504, the selecting module 1505, the inserting module 1506, the sending module 1507, and other modules 1508 described above, may refer to a combination of analog and digital circuits, and/or one or more processors configured with software and/or firmware, e.g. stored in the memory, that when executed by the one or more processors such as the processor 1509, perform actions as described above, in relation to any of FIGS. 7-14, as well as any of FIGS. 16, 17, 18, 19 and 20 described below. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Further description of particular examples related to embodiments herein, which may be combined with any of the embodiments just described:

It is an object of some embodiments herein to improve the performance of a communications network by providing improved methods of performing any one of transmission and reception of control information.

Several embodiments are comprised herein. More specifically, the followings are communication node related embodiments:

The communication node embodiments relate to FIGS. 16, 8, 11, 13, 15 and 19.

A method performed by a communication node such as the first communication node 511 for performing any one of transmission and reception in a determined third set of time-frequency resources 803 in a frame 800, the frame 800 further comprising at least one first set of time-frequency resources 801, and a second set of time-frequency resources 802, the at least one first set of time-frequency resources 801 and the second set of time-frequency resources 802 being non-overlapping in time, the at least one first set of time-frequency resources 801 being reserved for communication of control information, and the second set of time-frequency resources 802 being used for communication of at least data information, the first communication node 511 operating in a communications network 500, may comprise the actions of:

Determining 1601 that a third set of time-frequency resources 803 in the frame 800 is to be used for communication of control information, the third set of time-frequency resources 803 corresponding to a subset of the second set of time-frequency resources 802. This action 1601 may be performed by the determining module 1501 within the communication node such as the first communication node 511;

Determining 1602 a direction of communication in the third set of time-frequency resources 803 in the frame 800, the direction being one of transmission and reception. This action 1602 may be performed by the determining module 1501 within the communication node such as the first communication node 511;

Sending 1603 an indication to a second communication node 512 operating in the communications network 500, the second communication node 512 being a receiver or transmitter of data in at least a frame 800 from the first communication node 511, the indication being of a location and or usage of the third set of time-frequency resources 803 in the frame 800. This action 1603 may be performed by the sending module 1507 within the communication node such as the first communication node 511. The indication of the usage may comprise an indication that the usage is zero, that is, that the third set of time-frequency resources 803 in the frame 800 is not used.

Performing 1604a one of transmission or reception in the determined third set of time-frequency resources 803 to or from, respectively, the third communication node 513 operating in the communications network 500. This action 1604a may be performed by the performing module 1502 within the communication node such as the first communication node 511. The performing 604a may be in the determined direction of communication.

Interrupting 1604b data communication in the subset of the second set of time-frequency resources 802 corresponding to the third set of time-frequency resources 803. This action 1604b may be performed by the interrupting module 1503 within the communication node such as the first communication node 511;

Reducing 1604c transmission power in the subset of the second set of time-frequency resources 802 corresponding to the third set of time-frequency resources 803. This action 1604c may be performed by the reducing module 1504 within the communication node such as the first communication node 511. Transmission power is understood to refer herein to a communication power, that is a power of either one of transmission or reception.

In some embodiments, the interrupting is only on a subset of available Multiple Input Multiple Output streams.

In some embodiments, the third set of time-frequency resources 803 is placed in time, adjacent to at least one guard period.

In some embodiments, a direction of communication in the third set of time-frequency resources 803 in the frame 800, such as the determined direction of communication in action 1602, is opposite to a direction of communication in the second set of time-frequency resources 802 in the frame 800, the direction of communication being one of transmission and reception.

In some embodiments, the communications network 500 is one of: a wireless communications network 500 and a radio communications network 500.

In some embodiments all the actions may be performed. In some embodiments, one or more actions may be performed. In some embodiments, the order of the actions illustrated in FIG. 16 may be changed in one or more actions. One or more embodiments may be combined, where applicable. All possible combinations are not described to simplify the description.

To perform any of the method actions described above in relation to FIGS. 16, 8, 11, 13, 15 and 19, the first communication node 511 may be configured to perform any of the above actions, e.g., by means of the respective mentioned modules 1501-1504 and 1507.

The first communication node 511 may comprise an interface unit to facilitate communications between the first communication node 511 and other nodes or devices, e.g., UEs. The interface may, for example, include a transceiver configured to transmit and receive radio signals over an air interface in accordance with a suitable standard.

Several other embodiments are comprised herein. More specifically, the following are communication node related embodiments:

The communication node embodiments relate to FIGS. 17, 9, 11, 14, 15 and 19.

A method performed by a communication node such as the first communication node 511 for performing any one of transmission and reception of a third set of time-frequency resources 803, the first communication node 511 operating in a communications network 500, may comprise the actions of:

Determining 1701 that a third set of time-frequency resources 803 is to be used for communication of information, the third set of time-frequency resources 803 being placed between two frames 800 of time-frequency resources. This action 1701 may be performed by the determining module 1501 within the communication node such as the network first communication node 511;

Determining 1702 a direction of communication in the third set of time-frequency resources 803 in the frame 800, the direction being one of transmission and reception. This action 1702 may be performed by the determining module 1501 within the communication node such as the network first communication node 511;

Inserting 1703 one or more guard periods adjacent in time to the third set of time-frequency resources 803, according to the determined direction of communication in the third set of time-frequency resources 803. This action 1703 may be performed by the inserting module 1506 within the communication node such as the network first communication node 511.

Sending 1704 an indication to at least one of: the second communication node 512 operating in the communications network 500 and the third communication node 513, the second communication node 512 being a receiver or transmitter of data in at least one of the two frames 800, and the third communication node 513 being a receiver or transmitter of the information in the third set of time-frequency resources 803, the indication being of a location or presence of the third set of time-frequency resources 803. This action 1704 may be performed by the sending module 1507 within the communication node such as the network first communication node 511;

Performing 1705 one of transmission or reception in the determined third set of time-frequency resources 803 to or from, respectively, the third communication node 513 operating in the communications network 500. This action 1705 may be performed by the performing module 1502 within the communication node such as the network first communication node 511. The performing 1705 may be in determined direction of communication.

In some embodiments, each of the two frames 800 comprises at least one of: one or two first sets of time-frequency resources 8011, 8012, and a second set of time-frequency resources 802, the one or two first sets of time-frequency resources 8011, 8012 being reserved for communication of control information, and the second set of time-frequency resources 802 being reserved for communication of data information.

In some embodiments, the determining 1702 is independent of a direction of transmission or reception in the one or two first fields.

In some embodiments, the determining 1702 is based on a direction of transmission or reception in at least one of the one or two first fields.

In some embodiments, the determining 1702 is based on one of: the current frame 800 number and the current communication node identifier.

In some embodiments, the third communication node 513 is different than the second communication node 512 operating in the communications network 500, the second communication node 512 being a receiver or a transmitter of data in the frame 800.

The usage of the nomenclature first, second and third communication node is arbitrary and is only used to distinguish between the references to the communication nodes, according to an order, which may be an order of description herein.

The first node is different than the third node. In some embodiments, the second communication node and the third communication node may be the same node. In some other embodiments, the second communication node may be different than the third communication node. The third node is in some embodiments the same communication partner as the one of any of first set of time-frequency resources 801 in a or the frame 800 and the second set of time-frequency resources 802 in a or the frame 800. The third node is in some embodiments a different node than the communication partner of the one of any of first set of time-frequency resources 801 in a or the frame 800 and the second set of time-frequency resources 802 in a or the frame 800.

In some embodiments, the information in the third set of time-frequency resources 803 is at least one of: control information and data information.

In some embodiments, the communications network 500 is one of: the wireless communications network 500 and the radio communications network 500.

In some embodiments all the actions may be performed. In some embodiments, one or more actions may be performed. In some embodiments, the order of the actions illustrated in FIG. 17 may be changed in one or more actions. One or more embodiments may be combined, where applicable. All possible combinations are not described to simplify the description.

To perform any of the method actions described above in relation to FIGS. 17, 9, 11, 14, 15 and 19, the first communication node 511 may be configured to perform any of the above actions, e.g., by means of the respective mentioned modules 1501, 1502, 1506, 1507.

By the first communication node 511 determining that the third set of time-frequency resources 803 is to be used for communication of information, the first communication node 511 with e.g., half-duplex restrictions, may efficiently exchange control signaling with two or more communication nodes close in time, in both duplex directions. This may be performed in a configuration where the other sets of time-frequency resources in the frame 800 have a fixed direction of communication, which allows for flexibility of the signalling in the communications network, while minimizing the signalling among the communication nodes involved in a communication. By the third set of time-frequency resources 803 being placed between two frames 800 of time-frequency resources, where a switch in tx/rx direction can anyway occur, the need for extra guard periods is also minimized.

It is an object of some embodiments herein to improve the performance of a communications network by providing improved methods of performing one or more measurement procedures.

Several embodiments are comprised herein. More specifically, the followings are communication node related embodiments:

The communication node embodiments relate to FIGS. 18, 10, 12, 14, 15 and 20.

A method performed by a communication node such as the first communication node 511 for performing one or more measurement procedures, the first communication node 511 operating in a communications network 500, may comprise the actions of:

Selecting 1801 a subset of a second set of time-frequency resources 802 that is to be used to perform the one or more measurement procedures, the second set of time-frequency resources 802 being in a frame 800, the frame 800 further comprising at least one first set of time-frequency resources 801, the at least one first set of time-frequency resources 801 and the second set of time-frequency resources 802 being non-overlapping in time, the at least one first set of time-frequency resources 801 being reserved for communication of control information, and the second set of time-frequency resources 802 being used for communication of at least data information. This action 1801 may be performed by the selecting module 1505 within the communication node such as the first communication node 511;

Interrupting 1802 data communication in the subset of the second set of time-frequency resources 802 to perform the one or more measurement procedures, wherein the data communication is in a first direction of communication, and wherein the direction of communication is one of transmission and reception. This action 1802 may be performed by the interrupting module 1503 within the communication node such as the first communication node 511; The subset of the second set of time-frequency resources 802 may be also referred to as a third set of time-frequency resources 803 in the frame 800. In some embodiments, the subset of the second set of time-frequency resources 802 may be the selected subset of the second set of time-frequency resources 802, according to action 501.

Sending 1803 an indication to a second communication node 512 operating in the communications network 500, the second communication node 512 being a receiver or a transmitter of data in the second set of time-frequency resources 802, the indication being of at least one of: a usage of the subset of the second set of time-frequency resources 802 in the frame 800 to perform the one or more measurement procedures, and a location of the subset of the second set of time-frequency resources 802. This action 1803 may be performed by the sending module 1507 within the communication node such as the first communication node 511. The indication of the usage may comprise an indication that the usage is zero, that is, that the third set of time-frequency resources 803 in the frame 800 is not used. In some embodiments, the subset of the second set of time-frequency resources 802 may be the selected subset of the second set of time-frequency resources 802, according to action 1801.

Performing 1804 the one or more measurement procedures in the subset of the second set of time-frequency resources 802 in the second direction of communication, which second direction of communication is an opposite direction to the first direction of communication, the one or more measurement procedures being performed on one or more signals. This action 504 may be performed by the performing module 1502 within the communication node such as the first communication node 511. The performing 1804 may be in determined direction of communication. In some embodiments, the subset of the second set of time-frequency resources 802 may be the selected subset of the second set of time-frequency resources 802, according to action 1801.

In some embodiments, the one or more signals are of a communication between a third communication node 513 operating in the communications network 500 and a fourth communication node 514 operating in the communications network 500.

The usage of the nomenclature first, second, third and fourth communication node is arbitrary and is only used to distinguish between the references to the communication nodes, according to an order, which may be an order of description herein.

The first node is different than the second node. In some embodiments, the second communication node and any of the third communication node and the fourth communication node may be the same node. In some other embodiments, the second communication node may be different than any of the third communication node and the fourth communication node may be the same node. Any of the third communication node and the fourth communication node may be, in some embodiments, the same communication partner as the one of any of the at least one first set of time-frequency resources 801 and the second set of time-frequency resources 802 in a or the frame 800. Any of the third communication node and the fourth communication node may be, in some embodiments, a different communication node than the communication partner of the one of any of the at least one first set of time-frequency resources 801 and the second set of time-frequency resources 802 in a or the frame 800.

In some embodiments, the selecting 501 the subset of the second set of time-frequency resources 802 is performed pseudo-randomly.

In some embodiments, the selecting 501 the subset of the second set of time-frequency resources 802 is based on a parameter specific to the first communication node 511.

In some embodiments, the selecting 1801 the subset of the second set of time-frequency resources 802 is based on one of: a time when at least a second communication node 512 operating in the communications network 500 transmits one or more reference signals, and a frequency a time where at least a second communication node 512 transmits one or more reference signals.

In some embodiments, the interrupting 1801 is of at least a subset of available Multiple Input Multiple Output streams.

In some embodiments, the communications network 500 is one of: the wireless communications network 500 and the radio communications network 500.

In some embodiments all the actions may be performed. In some embodiments, one or more actions may be performed. In some embodiments, the order of the actions illustrated in FIG. 18 may be changed in one or more actions. One or more embodiments may be combined, where applicable. All possible combinations are not described to simplify the description.

To perform any of the method actions described above in relation to FIGS. 18, 10, 12, 14, 15 and 20, the first communication node 511 may be configured to perform any of the above actions, e.g., by means of the respective mentioned modules 1502, 1503, 1505 and 1507.

By the first communication node 511 interrupting data communication in the subset of the second set of time-frequency resources 802, e.g., in at least a subset of available Multiple Input Multiple Output streams, to perform the one or more measurement procedures, the first communication node 511 with e.g., half-duplex restrictions, may efficiently make measurements on transmission in other network links than the one currently being used for communication.

The invention claimed is:

1. A method performed by a first communication node in communication with a second communication node, for performing one of transmission and reception to or from, respectively, a third communication node, the second communication node being a receiver or transmitter of data from or to the first communication node in a frame, the frame comprising at least one first set of time-frequency resources reserved for communication of control information and a second set of time-frequency resources reserved for communication of at least data information, the first, second and third communication nodes operating in a communications network, the method comprising:
   determining that a third set of time-frequency resources is to be used for communication of information with the third communication node;
   determining a direction of communication in the third set of time-frequency resources, the direction of communication being one of transmission and reception, wherein the direction of communication in the third set of time-frequency resources is based on the information to be communicated, wherein the information being communicated is one or more signals related to one or more measurement procedures, and the direction of communication is opposite to a direction of communication in the second set of time-frequency resources, wherein the direction of communication in the second set of time-frequency resources is one of transmission and reception, and wherein the third set of time-frequency resources corresponds to a subset of the second set of time-frequency resources;
   interrupting data communication in the subset of the second set of time-frequency resources to perform the one or more measurement procedures, the one or more measurement procedures being performed on one or more signals to or from the third communication node; and
   performing one of transmission or reception to or from, respectively, the third communication node in the determined direction of communication, the performing of the one of transmission or reception being in the third set of time-frequency resources determined to be used for communication of the information with the third communication node.

2. The method of claim 1, further comprising:
   selecting the subset of the second set of time-frequency resources that is to be used to perform the one or more measurement procedures.

3. The method of claim 2, wherein the selecting the subset of the second set of time-frequency resources is performed pseudo-randomly.

4. The method of claim 2, wherein the selecting the subset of the second set of time-frequency resources is based on one of: a parameter specific to the first communication node, a time when at least the third communication node operating in the communications network transmits one or more reference signals, and a frequency where at least the third communication node transmits one or more reference signals.

5. The method of claim 1, further comprising:
   sending an indication to the second communication node operating in the communications network, the indication being of a location and or usage of the third set of time-frequency resources in the frame.

6. The method of claim 1, wherein the at least one first set of time-frequency resources and the second set of time-frequency resources are non-overlapping in time.

7. The method of claim 1, wherein the communications network is one of: a wireless communications network and a radio communications network.

8. A non-transitory computer-readable storage medium, having stored thereon a computer program, comprising instructions which, when executed on at least one processor of a first communication node in communication with a second communication node for performing one of transmission and reception to or from, respectively, a third communication node, the second communication node being a receiver or transmitter of data from or to the first communication node in a frame, the frame comprising at least one first set of time-frequency resources reserved for communication of control information and a second set of time-frequency resources reserved for communication of at least data information, cause the at least one processor to:
   determine that a third set of time-frequency resources is to be used for communication of information with the third communication node;
   determine a direction of communication in the third set of time-frequency resources, the direction of communication being one of transmission and reception, wherein the direction of communication in the third set of time-frequency resources is based on the information to be communicated, wherein the information being communicated is one or more signals related to one or more measurement procedures, wherein the direction of communication is opposite to a direction of communication in the second set of time-frequency resources, wherein the direction of communication in the second set of time-frequency resources is one of transmission and reception, and wherein the third set of time-frequency resources corresponds to a subset of the second set of time-frequency resources;
   interrupt data communication in the subset of the second set of time-frequency resources to perform the one or more measurement procedures, the one or more measurement procedures being configured to be performed on one or more signals to or from the third communication node; and
   perform one of transmission or reception to or from, respectively, the third communication node in the determined direction of communication, the performing of the one of transmission or reception being in the third set of time-frequency resources determined to be used for communication of the information with the third communication node.

9. A first communication node configured to be in communication with a second communication node, the first communication node further configured to perform one of transmission and reception to or from, respectively, a third communication node, the second communication node being configured to be a receiver or transmitter of data from or to the first communication node in a frame, the frame comprising at least one first set of time-frequency resources reserved for communication of control information and a second set of time-frequency resources reserved for communication of at least data information, the first, second, and third communication nodes being configured to operate in a communications network, the first communication node comprising:
   communication circuitry configured for communicating with the second and third communication nodes; and
   processing circuitry operatively associated with the communication circuitry and configured to:
      determine that a third set of time-frequency resources is to be used for communication of information with the third communication node;
      determine a direction of communication in the third set of time-frequency resources, the direction of communication being one of transmission and reception, wherein the direction of communication in the third set of time-frequency resources is configured to be based on the information to be communicated, wherein the information being communicated is one or more signals related to one or more measurement procedures, wherein the direction of communication is opposite to a direction of communication in the second set of time-frequency resources, wherein the direction of communication in the second set of time-frequency resources is one of transmission and reception, and wherein the third set of time-frequency resources corresponds to a subset of the second set of time-frequency resources;
      interrupt data communication in the subset of the second set of time-frequency resources to perform the one or more measurement procedures, the one or more measurement procedures being configured to be performed on one or more signals to or from the third communication node; and
      perform one of transmission or reception to or from, respectively, the third communication node in the determined direction of communication, wherein the performance of the one of transmission or reception is configured to be in the third set of time-frequency resources determined to be used for communication of the information with the third communication node.

10. The first communication node of claim 9, wherein the processing circuitry is configured to:
   select the subset of the second set of time-frequency resources that is to be used to perform the one or more measurement procedures.

11. The first communication node of claim 10, wherein the processing circuitry is configured to select the subset of the second set of time-frequency resources pseudo-randomly.

12. The first communication node of claim 10, wherein the processing circuitry is configured to select the subset of the second set of time-frequency resources based on one of: a parameter specific to the first communication node, a time when at least the third communication node configured to operate in the communications network transmits one or more reference signals, and a frequency where at least the third communication node transmits one or more reference signals.

13. The first communication node of claim 9, wherein the processing circuitry is configured to:
   send an indication to the second communication node configured to operate in the communications network, the indication being of a location and or usage of the third set of time-frequency resources in the frame.

14. The first communication node of claim 9, wherein the at least one first set of time-frequency resources and the second set of time-frequency resources are configured to be non-overlapping in time.

15. The first communication node of claim 9, wherein the communications network is one of: a wireless communications network and a radio communications network.

* * * * *